(12) United States Patent
Du et al.

(10) Patent No.: US 12,093,000 B2
(45) Date of Patent: Sep. 17, 2024

(54) BUILDING MANAGEMENT SYSTEM WITH AUTOMATIC TRAINING DATA SELECTION FOR ONLINE SYSTEM IDENTIFICATION

(71) Applicant: Tyco Fire & Security GmbH, Neuhausen am Rheinfall (CH)

(72) Inventors: Fang Du, Milwaukee, WI (US); Anas W. I. Alanqar, Milwaukee, WI (US); Michael J. Wenzel, Grafton, WI (US); Mohammad N. ElBsat, Milwaukee, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 526 days.

(21) Appl. No.: 17/386,253

(22) Filed: Jul. 27, 2021

(65) Prior Publication Data
US 2022/0035324 A1    Feb. 3, 2022

Related U.S. Application Data

(60) Provisional application No. 63/059,014, filed on Jul. 30, 2020.

(51) Int. Cl.
*G05B 15/02* (2006.01)
*G06N 20/00* (2019.01)

(52) U.S. Cl.
CPC ............ *G05B 15/02* (2013.01); *G06N 20/00* (2019.01)

(58) Field of Classification Search
CPC .......... G05B 15/02; G05B 2219/25011; G05B 17/02; G06N 20/00
See application file for complete search history.

(56) References Cited

U.S. PATENT DOCUMENTS

| | | | |
|---|---|---|---|
| 9,447,985 | B2 | 9/2016 | Johnson |
| 10,871,756 | B2 | 12/2020 | Johnson et al. |
| 10,908,578 | B2 | 2/2021 | Johnson et al. |
| 10,921,768 | B2 | 2/2021 | Johnson et al. |
| 11,156,978 | B2 | 10/2021 | Johnson et al. |

(Continued)

FOREIGN PATENT DOCUMENTS

| | | |
|---|---|---|
| CA | 2957726 A1 | 3/2016 |
| CA | 3043996 A1 | 2/2018 |

(Continued)

OTHER PUBLICATIONS

CoolingLogic, "CoolingLogic: Up early, saving billions." URL: http://coolinglogic.com/documents/MarketingFlyer_FINAL_HiRes8. 5x11.pdf, retrieved from internet Oct. 27, 2022 (1 page).

(Continued)

*Primary Examiner* — Christopher W Carter
(74) *Attorney, Agent, or Firm* — Foley & Lardner LLP

(57) ABSTRACT

A method includes operating equipment in accordance with a setpoint to affect a measurement for a space during a training period, performing a plurality of assessments of different characteristics of data for a segment of the training period, and training a system model using a set of training data. The data for the segment is included in the set of training data in response to passing the plurality of assessments or excluded from the set of training data in response to failing one or more of the plurality of assessments. The method also includes controlling the equipment using the system model.

23 Claims, 9 Drawing Sheets

(56) References Cited

U.S. PATENT DOCUMENTS

| | | | |
|---|---|---|---|
| 2003/0055798 | A1 | 3/2003 | Hittle et al. |
| 2003/0130899 | A1* | 7/2003 | Ferguson ............... G06Q 30/06 |
| | | | 705/26.1 |
| 2016/0098022 | A1* | 4/2016 | Wenzel ................. G05B 15/02 |
| | | | 700/275 |
| 2018/0046926 | A1* | 2/2018 | Achin .................... G06F 9/5011 |
| 2019/0025774 | A1* | 1/2019 | Wenzel ............... G05B 13/048 |
| 2019/0257544 | A1 | 8/2019 | Alanqar et al. |
| 2019/0316802 | A1* | 10/2019 | Alanqar .................. F24F 11/64 |
| 2021/0018198 | A1* | 1/2021 | Alanqar .................. F24F 11/65 |
| 2021/0018205 | A1 | 1/2021 | Ellis et al. |
| 2021/0018209 | A1* | 1/2021 | Ellis ..................... G05B 13/041 |
| 2022/0018566 | A1* | 1/2022 | Kurganskii ............ G06N 20/00 |

FOREIGN PATENT DOCUMENTS

| | | |
|---|---|---|
| EP | 1 156 286 A2 | 11/2001 |
| EP | 3 186 687 A4 | 7/2017 |
| EP | 3 497 377 A1 | 6/2019 |
| WO | WO-2012/161804 A1 | 11/2012 |
| WO | WO-2013/130956 A1 | 9/2013 |

OTHER PUBLICATIONS

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System—Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System—JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency And Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

Afram et al., "Theory and Application of HVAC Control Systems—A review of Model Predictive Control (MPC)," Building and Environment, Feb. 2014, vol. 72 (pp. 343-355).

(56) References Cited

OTHER PUBLICATIONS

Ahn et al., "Optimal Control Development for Chilled Water Plants Using a Quadratic Representation," Energy and Buildings, Apr. 2001, vol. 33, No. 4 (pp. 371-378).
Burer et al., "Non-convex Mixed-Integer Nonlinear Programming: A Survey," Surveys in Operations Research and Management Science, Jul. 2012, vol. 17, No. 2 (pp. 97-106).
Cantoni, A., "Optimal Curve Fitting with Piecewise Linear Functions," IEEE Transactions on Computers, Jan. 1971, vol. 20, No. (pp. 59-67).
Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).
Drgona et al., "All you Need to Know about Model Predictive Control for Buildings," Annual Reviews in Control, 2020, vol. 50 (pp. 190-232).
EPO Notice of Opposition to a European Patent issued in Appl. Ser. No. EP 16165681.4 dated May 2, 2023 (48 pages).
EPO Notice of Opposition to a European Patent issued in Appl. Ser. No. EP 16165681.4 dated May 2, 2023 (51 pages).
EPO Notice of Opposition to a European Patent with Consolidated List issued in EP Appl. Ser. No. 16165681.4 dated May 2, 2023 (4 pages).
EPO Office Action on EP Appl. Ser. No. 16165681.4 dated Apr. 6, 2021 (7 pages).
Extended European Search Report on EP Appl. Ser. No. 16165681.4 dated Oct. 20, 2016 (5 pages).
Extended European Search Report on EP Appl. Ser. No. 22177772.5 dated Sep. 26, 2022 (11 pages).
Hackner, J.R., "HVAC system dynamics and energy use in existing buildings," Doctoral Dissertation, University of Madison, Wisconsin, 1984 (174 pages).
Haves et al., "Model Predictive Control of HVAC Systems: Implementation and Testing at the University of California, Merced," Technical Report, U.S. Department of Energy Office of Scientific and Technical Information, Jun. 29, 2010 (140 pages).
Huang et al., "A New Model Predictive Control Scheme for Energy and Cost Savings in Commercial Buildings: An Airport Terminal Building Case Study," Building and Environment, Jul. 2015, vol. 89 (pp. 203-216).
Kelman et al., "Analysis of Local Optima in Predictive Control for Energy Efficient Buildings," Journal of Building Performance Simulation, Apr. 16, 2012, vol. 6, No. 3 (pp. 236-255).
Koehler et al., "Building Temperature Distributed Control via Explicit MPC and 'Trim and Respond' Methods," European Control Conference (ECC), Jul. 17-19, 2013, Zurich, Switzerland (pp. 4334-4339).
Kwadzogah et al., "Model Predictive Control for HVAC Systems—A Review," 2013 IEEE International Conference on Automation Science and Engineering, Model Predictive Control for HVAC Systems—A Review, 2013 IEEE International Conference on Automation Science and Engineering (CASE), Madison, WI, United States, Aug. 17-20, 2013 (pp. 442-447).
Mckenna et al., "A TRNSYS model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).
Mossolly et al., "Optimal Control Strategy for a Multizone Air Conditioning System Using a Genetic Algorithm," Energy, Jan. 2009, vol. 34, No. 1 (pp. 58-66).
Nassif et al., "Optimization of HVAC Control System Strategy Using Two-Objective genetic Algorithm," International Journal of HVA C&R Research, vol. 11, No. 3 (pp. 459-486).
Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).
Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).
Strurznegger, D., "Model Predictive Building Climate Control, Steps Towards Practice," Doctoral Thesis, Automatic Control Laboratory, Zurich, Switzerland, 2014 (176 pages).
Sun et al., Optimal Control of Building HVAC&R Systems Using Complete Simulation-Based Sequential Quadratic Programming (CSB-SQP), Building and Environment, May 2005, vol. 40, No. 5 (pp. 657-669).
Third Party Observation Report on EP Appl. Ser. No. 16165681.4 dated Jan. 15, 2020 (8 pages).
Third Party Observation Report on EP Appl. Ser. No. 16165681.4 dated Oct. 5, 2018 (6 pages).
Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).
Verhelst, C., "Model Predictive Control of Ground Coupled Heat Pump Systems in Office Buildings," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).
Wang et al., "Model-Based Optimal Control of VAV Air-Conditioning System Using Genetic Algorithm," Building and Environment, Aug. 2000, vol. 35, No. 6 (pp. 471-487).
Wang et al., "Supervisory and Optimal Control of Building HVAC Systems: A Review," HVAC&R Research, Jan. 2008, vol. 14, No. 1 (pp. 3-32).
Xi et al., "Support Vector Regression Model Predictive Control on a HVAC Plant," Control Engineering Practice, Aug. 2007, vol. 15, No. 8 (pp. 897-908).
Yao et al., "Global Optimization of a Central Air-Conditioning System Using Decomposition-Coordination Method," Energy and Buildings, May 2010, vol. 42, No. 5 (pp. 570-583).

* cited by examiner

BUILDING MANAGEMENT SYSTEM WITH AUTOMATIC TRAINING DATA SELECTION FOR ONLINE SYSTEM IDENTIFICATION

CROSS-REFERENCE TO RELATED APPLICATION

This application claims priority to and the benefit of U.S. Provisional Application No. 63/059,014, filed Jul. 30, 2020, the entire disclosure of which is incorporated by reference herein.

BACKGROUND

The present disclosure relates generally to control systems for buildings. The present disclosure relates more particularly to controlling building equipment to generate accurate models through system identification.

System identification refers to a determination of a model that describes a system. For example, system identification may be used to identify a system describing environmental conditions. Because the physical phenomena that govern such systems are often complex, nonlinear, and poorly understood, system identification requires the determination of model parameters based on measured and recorded data from the real system in order to generate an accurate predictive model. The predictive model therefore reflects the system dynamics represented in the measured and recorded data. Accordingly, systems and methods for automatically selecting training data which are suitable for generating an accurate predictive model would be advantageous and may facilitate automatic system identification based on data collected while a system is operated in a normal, online operational manner.

SUMMARY

One implementation of the present application is a method including operating equipment in accordance with a setpoint to affect a measurement for a space during a training period, performing a plurality of assessments of different characteristics of data for a segment of the training period, and training a system model using a set of training data. The data for the segment is included in the set of training data in response to passing the plurality of assessments or excluded from the set of training data in response to failing one or more of the plurality of assessments. The method also includes controlling the equipment using the system model.

In some embodiments, performing the plurality of assessments includes performing a first assessment of a correlation between the setpoint and the measurement during the segment, performing a second assessment of a load on the equipment during the segment relative to a threshold load, performing a third assessment of durations between setpoint changes during the segment.

In some embodiments, performing the plurality of assessments includes performing a first assessment. The first assessment includes calculating a correlation coefficient based on values of the setpoint and the measurement for the segment and comparing the correlation coefficient to a threshold value. In some embodiments, performing the plurality of assessments comprises performing a second assessment of a load on the equipment during the segment relative to a threshold load. The second assessment includes determining the threshold load as a percentage of a maximum load during the segment. In some embodiments, the second assessment includes determining whether the load on the equipment exceeds the threshold load for at least a threshold amount of the segment.

In some embodiments, the method includes performing the plurality of assessments comprises performing an assessment that includes determining the durations between setpoint changes during the segment, labeling the setpoint changes to corresponding to durations within a predefined range as valid setpoint changes, calculating a sum of the durations for the valid setpoint changes, and comparing the sum to a threshold value.

In some embodiments, the method includes repeating the plurality of assessments for a plurality of additional segments of the training period and including or excluding, from a set of training data, data corresponding to the plurality of additional segments based on results of the plurality of assessments for the plurality of additional segments. In some embodiments, the segment is a day (e.g., 24 hours long).

In some embodiments, the method also includes repeating the plurality of assessments for a plurality of additional segments of the training period and including or excluding, from the set of training data, data corresponding to the plurality of additional segments based on results of the plurality of assessments for the plurality of additional segments. In some embodiments, the method also includes determining whether a total duration of the segment and the additional segments included in the set of training data exceeds a threshold duration.

Another implementation of the present disclosure is a system. The system includes building equipment configured to operate in accordance with a setpoint for a variable state or condition of a space. The system also includes a sensor configured to obtain a measured value for the variable state or condition of the space and a controller. The controller is configured to perform, for a segment of a training period, a test comprising at least one of a first assessment of a correlation between the setpoint and the measured value during the segment, a second assessment of a load on the building equipment during the segment relative to a threshold load, a third assessment of durations between setpoint changes during the segment, or a fourth assessment of a count of the setpoint changes during the segment that satisfy a criterion. The controller is also configured to train a system model using a set of training data, wherein data corresponding to the segment is included or excluded from the set of training data based on the first assessment, the second assessment, and the third assessment, and control the building equipment using the system model.

In some embodiments, the test includes the first assessment. The first assessment can be performed by calculating a correlation coefficient based on values of the setpoint and the measured value for the segment and comparing the correlation coefficient to a threshold value.

In some embodiments, the test includes the second assessment. The second assessment can be performed by determining the threshold load as a percentage of a maximum load during the segment. In some embodiments, the controller is configured to perform the second assessment by determining whether the load on the equipment exceeds the threshold load for at least a threshold amount of the segment.

In some embodiments, the test includes the third assessment. The third assessment can be performed by determining the durations between the setpoint changes during the segment, labeling the setpoint changes t corresponding to durations within a predefined range as valid setpoint changes, calculating a sum of the durations for the valid setpoint changes, and comparing the sum to a threshold value. The controller may be configured to perform the third assessment by ignoring setpoint changes within a preset tolerance. In some embodiments, the controller is configured to perform the fourth assessment. The fourth assessment includes determining the durations between the setpoint changes during the segment, labeling the setpoint changes corresponding to durations within a predefined range as valid setpoint changes, and comparing a count of the valid setpoint changes to a threshold value.

In some embodiments, the controller is configured to repeat the test for a plurality of additional segments of the training period and include or exclude, from the set of training data, data corresponding to the plurality of additional segments based on results of tests. The controller is further configured to determine whether a total duration of the segment and additional segments included in the set of training data exceeds a threshold duration.

In some embodiments, the test includes the first assessment, the second assessment, the third assessment, and the fourth assessment.

Another implementation of the present disclosure is non-transitory computer-readable media storing program instructions that, when executed by a processor, cause the processor to perform operations. The operations include performing, for a segment of a training period, a test comprising at least one of a first assessment of whether a correlation between a setpoint and a measurement during the segment satisfies a threshold correlation, a second assessment of whether a load on equipment exceeds a threshold load for at least an amount of the segment, and a third assessment of durations between setpoint changes during the segment relative to a minimum threshold duration and a maximum threshold duration. The operations also include including or excluding the training data for the segment from a set of training data for the training period based on the test, and controlling the equipment using a model trained based on the set of training data.

In some embodiments, performing the test includes performing the first assessment. Performing the first assessment includes calculating a correlation coefficient based on values of the e setpoint and the measurement for the segment and comparing the correlation coefficient to a threshold value. In some embodiments, the test includes performing the second assessment and the second assessment includes determining the threshold load as a percentage of a maximum load during the segment. In some embodiments, performing the second assessment includes determining whether the load on the equipment exceeds the threshold load for at least a threshold amount of the segment.

In some embodiments, performing the third assessment includes determining the durations between setpoint changes during the segment, labeling the setpoint changes corresponding to durations within a predefined range as valid setpoint changes, calculating a sum of the durations for the valid setpoint changes, and comparing the sum to threshold value. In some embodiments, performing the third assessment includes comparing a count of the valid setpoint changes to a threshold number.

In some embodiments, the operations also include repeating the test for a plurality of additional segments of a training period and including or excluding, from a set of training data, data corresponding to the plurality of additional segments based on results of the tests.

In some embodiments, the operations also include generating a set of control signals for the equipment that are predicted to cause the segment pass the test when the control signals are applied to the equipment during the segment and executing a system identification experiment by applying the control signals to the equipment. In some embodiments, controlling the equipment using the model comprises generating control signals for the equipment as outputs of a model predictive control approach based on the model.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
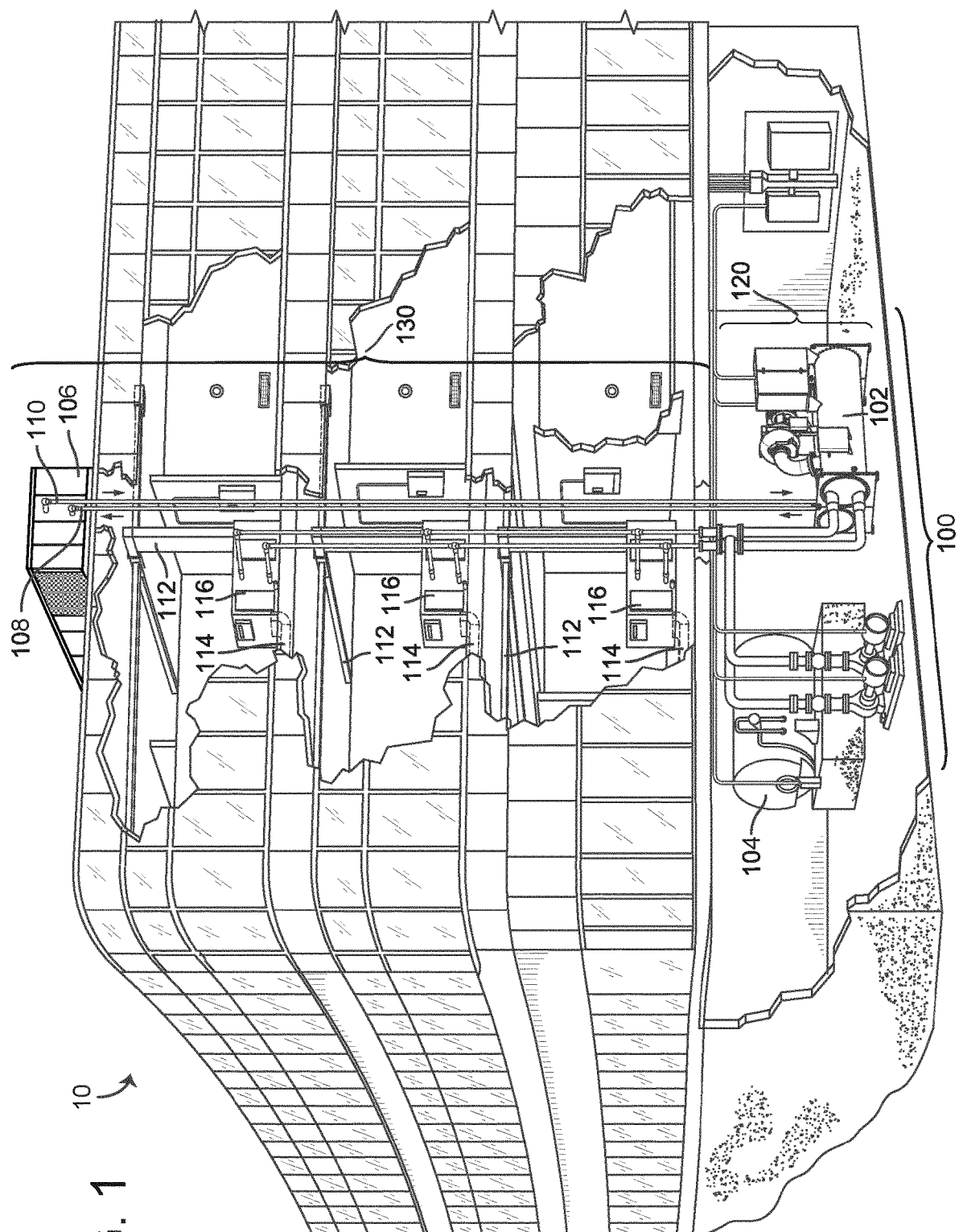
FIG. 1 is a drawing of a building equipped with a HVAC system, according to some embodiments.

Referring generally to the FIGURES, systems and methods for automatic training data selection for use in online system identification is shown, according to an exemplary embodiment. The accuracy of a predictive model identified through a system identification process (for example using the systems and methods described herein) is reliant on how well the training data represents the true system dynamics. The features of the present application include a determination that the quality of the training data can be assessed in terms of several characteristics.

First, the training data must represent scenarios in which the HVAC system is well-controlled. That is, the HVAC system should be actively operating to (successfully) control indoor air temperature. For example, actuator saturation, referring to a situation in which the HVAC system (and/or HVAC equipment therein) is providing a maximum or a minimum value of heat transfer $\dot{Q}_{HVAC}$ without tracking a temperature setpoint, such that the system is not well-controlled. Actuator saturation can jeopardize the quality of the data. Other scenarios may occur which cause the HVAC system to be unable to control the actual/measured temperature to track a temperature setpoint. Using such data can result in unreliable models. Accordingly, sufficient correlation between temperature setpoints and measured temperatures is one criterion that can be used to assess quality of training data for use in system identification.

Second, the data used for system identification must be under a sufficient heating or cooling load. Low load results in the HVAC working in "off" or economy mode, since not much heat is needed to be provided or removed. This situation can happen in shoulder seasons (e.g., spring, fall) where outdoor air temperature is close to comfortable indoor air temperatures. The result of low load periods is data that does not contain sufficient excitations of the system and therefore do not reflect a sufficient range of thermal dynamics to train an accurate building model. Accordingly, assessing the amount of time spent in at a low load can provide a second criterion that can be used to assess the quality of training data for use in system identification.

Third, the data used for system identification must include a proper amount of HVAC system excitations. When a system is in good control and is under enough heating or cooling loads, excitations result from setpoint changes with sufficient frequencies. Low-frequency setpoint excitation (i.e., long durations between setpoint changes, no or few setpoint changes) may result constant states that do not show sufficient dynamics for training a model. In such scenarios, data must be used over a very long time span to collect enough setpoint changes for model training, and the data may then primarily reflect slower-moving dynamics of the system. Also, very high frequency setpoint excitations (i.e., short durations between setpoint changes, many setpoint changes) are also not favored in training data as they do not allow the building and the HVAC system enough time to respond to the setpoint change. Additional, high-frequency excitations may be difficult to distinguish from sensor noise or other disturbances which may have a similar frequency. Therefore, an assessment of whether a set of training data includes sufficient excitations in a preferred range between extreme low-frequency and extreme high-frequency is a third criterion that can be used to assess the quality of training data for use in system identification.

As described in detail below, an approach can be implemented to automatically perform the assessments to determine whether sets of training data meet these multiple criteria (e.g., three, four) for setpoint-to-measured temperature correlation, sufficiently high loads, and sufficient proper-frequency excitations. By automatically assessing sets of possible training data and then selecting some of those sets to be used in system identification based on results of the assessments, the use of high quality of training data can be automatically ensured. Improved models can be achieved as a result.

Furthermore, in some cases, performing automatic data selection can enable training data to be collected during online operation of a building management system and HVAC system (e.g., during normal operations while the building is occupied). For example, in alternative embodiments or in cases where insufficient quality data is obtained, an experiment can be performed by controlling the HVAC system to explore a wide range of system dynamics. Such experiments may include creating discomfort by occupants by heating or cooling the building beyond a comfortable level. The systems and methods of automatic data selection for system identification described herein may allow for data to be collected without such disruptive experiments by allowing data to be collected while the building is occupied over various weather conditions and temperature setpoint changes (e.g., user-requested setpoint changes, setpoint changes provided by a model predictive controller) and then automatically selecting a subset of the data that will result in an accurate system model. Data that would result in a less-accurate model can be discarded. Accordingly, the disclosure herein enables automated online system identification, which may be particularly useful for retrofitting buildings with a model-based controller, periodically updating a system model, and/or capturing dynamics that may be affected by human activity in the building. These and other features and advantages are described in detail below.

Building HVAC Systems

Referring to FIG. 1, a perspective view of a building 10 is shown. Building 10 is served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

HVAC system 100 thereby provides heating and cooling to the building 10. The building 10 also includes other sources of heat transfer that the indoor air temperature in the building 10. The building mass (e.g., walls, floors, furniture) influences the indoor air temperature in building 10 by storing or transferring heat (e.g., if the indoor air temperature is less than the temperature of the building mass, heat transfers from the building mass to the indoor air). People, electronic devices, other appliances, etc. ("heat load") also contribute heat to the building 10 through body heat, electrical resistance, etc. Additionally, the outside air temperature impacts the temperature in the building 10 by providing heat to or drawing heat from the building 10.

HVAC System and Model

Figure 2:
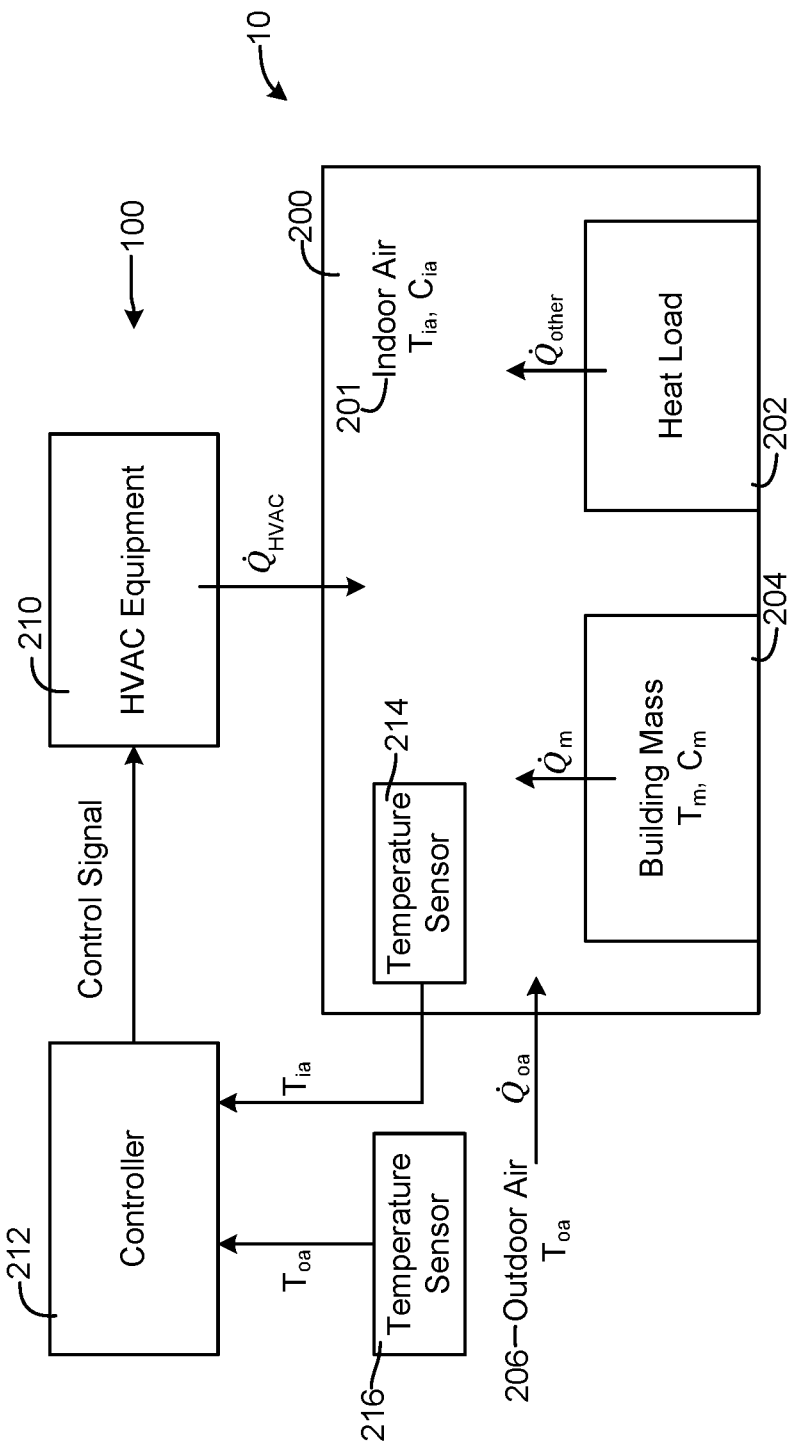
FIG. 2 is a block diagram of the building and HVAC system of FIG. 1, according to some embodiments.

Referring now to FIG. 2, a block diagram of the HVAC system 100 with building 10 is shown, according to an exemplary embodiment. More particularly, FIG. 2 illustrates the variety of heat transfers that affect the indoor air temperature $T_{ia}$ of the indoor air 201 in zone 200 of building 10. Zone 200 is a room, floor, area, etc. of building 10. In general, the primary goal of the HVAC system 100 is to maintain the indoor air temperature $T_{ia}$ the zone 200 at or around a desired temperature to facilitate the comfort of occupants of the zone 200 or to meet other needs of the zone 200.

As shown in FIG. 2, the indoor air temperature Ea of the zone 200 has a thermal capacitance $C_{ia}$. The indoor air temperature $T_{ia}$ is affected by a variety of heat transfers $\dot{Q}$ into the zone 200, as described in detail below. It should be understood that although all heat transfers $\dot{Q}$ are shown in FIG. 2 as directed into the zone 200, the value of one or more of the heat transfers $\dot{Q}$ may be negative, such that heat flows out of the zone 200.

The heat load 202 contributes other heat transfer $\dot{Q}_{other}$ to the zone 200. The heat load 202 includes the heat added to the zone by occupants (e.g., people, animals) that give off body heat in the zone 200. The heat load 202 also includes computers, lighting, and other electronic devices in the zone 200 that generate heat through electrical resistance, as well as solar irradiance.

The building mass 204 contributes building mass heat transfer $\dot{Q}_m$ to the zone 200. The building mass 204 includes the physical structures in the building, such as walls, floors, ceilings, furniture, etc., all of which can absorb or give off heat. The building mass 204 has a temperature $T_m$ and a lumped mass thermal capacitance $C_m$. The resistance of the building mass 204 to exchange heat with the indoor air 201 (e.g., due to insulation, thickness/layers of materials, etc.) may be characterized as mass thermal resistance $R_{mi}$.

The outdoor air 206 contributes outside air heat transfer $\dot{Q}_{oa}$ to the zone 200. The outdoor air 206 is the air outside of the building 10 with outdoor air temperature $T_{oa}$. The outdoor air temperature $T_{oa}$ fluctuates with the weather and climate. Barriers between the outdoor air 206 and the indoor air 201 (e.g., walls, closed windows, insulation) create an outdoor-indoor thermal resistance $R_{oi}$ to heat exchange between the outdoor air 206 and the indoor air 201.

The HVAC system 100 also contributes heat to the zone 200, denoted as $\dot{Q}_{HVAC}$. The HVAC system 100 includes HVAC equipment 210, controller 212, an indoor air temperature sensor 214 and an outdoor air temperature sensor 216. The HVAC equipment 210 may include the waterside system 120 and airside system 130 of FIG. 1, or other suitable equipment for controllably supplying heating and/or cooling to the zone 200. In general, HVAC equipment 210 is controlled by a controller 212 to provide heating (e.g., positive value of HVAC) or cooling (e.g., a negative value of $\dot{Q}_{HVAC}$) to the zone 200.

The indoor air temperature sensor 214 is located in the zone 200, measures the indoor air temperature $T_{ia}$, and provides the measurement of $T_{ia}$ to the controller 212. The outdoor air temperature sensor 216 is located outside of the building 10, measures the outdoor air temperature $T_{oa}$, and provides the measurement of $T_{oa}$ to the controller 212.

The controller 212 receives the temperature measurements $T_{oa}$ and $T_{ia}$, generates a control signal for the HVAC equipment 210, and transmits the control signal to the HVAC equipment 210. The operation of the controller 212 is discussed in detail below. In general, the controller 212 considers the effects of the heat load 202, building mass 204, and outdoor air 206 on the indoor air 201 in controlling the HVAC equipment 210 to provide a suitable level of $\dot{Q}_{HVAC}$. A model of this system for use by the controller 212 is described with reference to FIG. 3.

In the embodiments described herein, the control signal provide to the HVAC equipment 210 by the controller 110 indicates a temperature setpoint $T_{sp}$ for the zone 200. To determine the temperature setpoint $T_{sp}$, the controller 212 assumes that the relationship between the indoor air temperature $T_{ia}$ and the temperature setpoint $T_{sp}$ follows a proportional-integral control law with saturation, represented as:

$$\dot{Q}_{HVAC,j} = K_{p,j}\varepsilon_{sp} + K_{I,j}\int_0^t \varepsilon_{sp}(s)ds \qquad \text{(Eq. A)}$$

$$\varepsilon_{sp} = T_{sp,j} - T_{ia} \qquad \text{(Eq. B)}$$

where $j \in \{clg, hlg\}$ is the index that is used to denote either heating or cooling mode. Different parameters $K_{p,j}$ and $K_{I,j}$ are needed for the heating and cooling mode. Moreover, the heating and cooling load is constrained to the following set: $\dot{Q}_{HVAC,j} \in [0, \dot{Q}_{clg,max}]$ for cooling mode (j=clg) and $\dot{Q}_{HVAC,j} \in [-\dot{Q}_{htg,max}, 0]$ for heating mode (j=htg). As discussed in detail below with reference to FIG. 4, the controller 212 uses this model in generating a control signal for the HVAC equipment 210.

Figure 3:
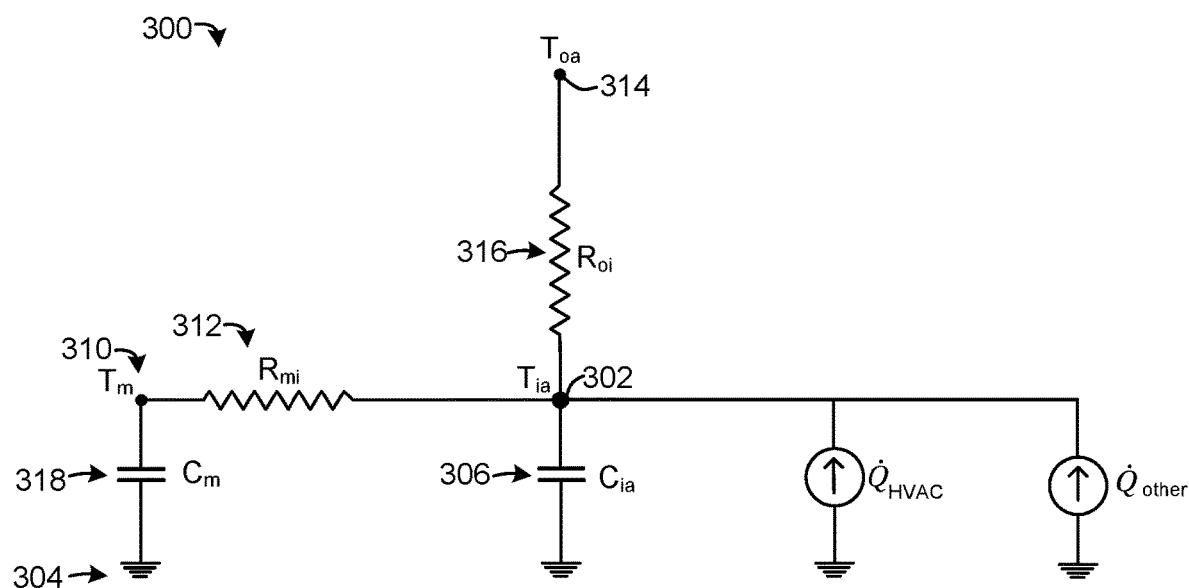
FIG. 3 is a circuit-style diagram of a model of the building and HVAC system of FIG. 1, according to some embodiments.

Referring now to FIG. 3, a circuit-style diagram 300 corresponding to the zone 200 and the various heat transfers Q of FIG. 2 is shown, according to an exemplary embodiment. In general, the diagram 300 models the zone 200 as a two thermal resistance, two thermal capacitance, control-oriented thermal mass system. This model can be characterized by the following system of linear differential equations, described with reference to FIG. 3 below:

$$C_{ia}\dot{T}_{ia} = \quad \text{(Eq. C)}$$
$$\frac{1}{R_{mi}}(T_m - T_{ia}) + \frac{1}{R_{oi}}(T_{oa} - T_{ia}) - \dot{Q}_{HVAC} + \dot{Q}_{other}$$

$$C_m \dot{T}_m = \frac{1}{R_{mi}}(T_{ia} - T_m) \quad \text{(Eq. D)}$$

where the first line (Eq. C) focuses on the indoor air temperature $T_{ia}$, and each term in Eq. C corresponds to a branch of diagram 300 as explained below:

Indoor air node 302 corresponds to the indoor air temperature $T_{ia}$. From indoor air node 302, the model branches in several directions, including down to a ground 304 via a capacitor 306 with a capacitance $C_{ia}$. The capacitor 306 models the ability of the indoor air to absorb or release heat and is associated with the rate of change of the indoor heat transfer $\dot{T}_{ia}$. Accordingly, the capacitor 306 enters Eq. C on the left side of the equation as $C_{ia}\dot{T}_{ia}$.

From indoor air node 302, the diagram 300 also branches left to building mass node 310, which corresponds to the thermal mass temperature $T_m$. A resistor 312 with mass thermal resistance $R_{mi}$ separates the indoor air node 302 and the building mass node 310, modeling the heat transfer $\dot{Q}_m$ from the building mass 204 to the indoor air 201 as $$\frac{1}{R_{mi}}(T_m - T_{ia}).$$

This term is included on the right side of Eq. C above as contributing to the rate of change of the indoor air temperature $\dot{T}_{ia}$.

The diagram 300 also branches up from indoor air node 302 to outdoor air node 314. A resistor 316 with outdoor-indoor thermal resistance $R_{oi}$ separates the indoor air node 302 and the outdoor air node 314, modeling the flow heat from the outdoor air 206 to the indoor air 201 as $$\frac{1}{R_{oi}}(T_{oa} - T_{ia}).$$

This term is also included on the right side of Eq. C above as contributing to the rate of change of the indoor air temperature $\dot{T}_{ia}$.

Also from indoor air node 302, the diagram 300 branches right to two $\dot{Q}$ sources, namely $\dot{Q}_{HVAC}$ and $\dot{Q}_{other}$. As mentioned above, $\dot{Q}_{other}$ corresponds to heat load 202 and to a variety of sources of energy that contribute to the changes in the indoor air temperature $T_{ia}$. $\dot{Q}_{other}$ is not measured or controlled by the HVAC system 100, yet contributes to the rate of change of the indoor air temperature $\dot{T}_{ia}$. $\dot{Q}_{HVAC}$ is generated and controlled by the HVAC system 100 to manage the indoor air temperature $T_{ia}$. Accordingly, $\dot{Q}_{HVAC}$ and $\dot{Q}_{other}$ are included on the right side of Eq. C above.

The second differential equation (Eq. D) above focuses on the rate of change $\dot{T}_m$ in the building mass temperature T. The capacity of the building mass to receive or give off heat is modelled by capacitor 318. Capacitor 318 has lumped mass thermal capacitance $C_m$ and is positioned between a ground 304 and the building mass node 310 and regulates the rate of change in the building mass temperature $T_m$. Accordingly, the capacitance $C_m$ is included on left side of Eq. D. Also branching from the building mass node 310 is resistor 312 leading to indoor air node 302. As mentioned above, this branch accounts for heat transfer $\dot{Q}_m$ between the building mass 204 and the indoor air 201. Accordingly, the term, $$\frac{1}{R_{mi}}(T_{ia} - T_m)$$

is included on the right side of Eq. D.

As described in detail below, the model represented by diagram 300 is used by the controller 212 in generating a control signal for the HVAC equipment 210. More particularly, the controller 212 uses a state-space representation of the model shown in diagram 300. The state-space representation used by the controller 212 can be derived by incorporating Eq. A and B with Eq. C and D, and writing the resulting system of equations as a linear system of differential equations to get:

$$\begin{bmatrix} \dot{T}_{ia} \\ \dot{T}_m \\ \dot{I} \end{bmatrix} = \begin{bmatrix} \frac{1}{C_{ia}}\left(K_{P,j} - \frac{1}{R_{mi}} - \frac{1}{R_{oi}}\right) & \frac{1}{C_{ia}R_{mi}} & \frac{K_{I,j}}{C_{ia}} \\ \frac{1}{C_m R_{mi}} & -\frac{1}{C_m R_{mi}} & 0 \\ -1 & 0 & 0 \end{bmatrix} \begin{bmatrix} T_{ia} \\ T_m \\ I \end{bmatrix} + \quad \text{(Eq. E)}$$

$$\begin{bmatrix} -\frac{K_{P,j}}{C_{ia}} & \frac{1}{C_{ia}R_{oi}} \\ 0 & 0 \\ 1 & 0 \end{bmatrix} \begin{bmatrix} T_{sp,j} \\ T_{oa} \end{bmatrix} + \begin{bmatrix} \frac{1}{C_{ia}} \\ 0 \\ 0 \end{bmatrix} \dot{Q}_{other};$$

$$\begin{bmatrix} T_{ia} \\ \dot{Q}_{HVAC,j} \end{bmatrix} = \begin{bmatrix} 1 & 0 & 0 \\ -K_{P,j} & 0 & K_{I,j} \end{bmatrix} \begin{bmatrix} T_{ia} \\ T_m \\ I \end{bmatrix} + \begin{bmatrix} 0 & 0 \\ K_{P,j} & 0 \end{bmatrix} \begin{bmatrix} T_{sp,j} \\ T_{oa} \end{bmatrix}; \quad \text{(Eq. F)}$$

where I represents the integral term $\int_0^t \varepsilon_{sp}(s)\,ds$ from Eq. A. The resulting linear system has three states ($T_{ia}$, $T_m$, I), two inputs ($T_{sp,j}$, $T_{oa}$), two outputs ($T_{ia}$, $\dot{Q}_{HVAC}$), and one disturbance $\dot{Q}_{other}$. Because $\dot{Q}_{other}$ is not measured or controlled, the controller 212 models the disturbance $\dot{Q}_{other}$ using an input disturbance model that adds a forth state d to the state space representation. In a more compact form, this linear system of differential equations can be written as:

$$\dot{x}(t) = A_c(\theta)x(t) + B_c(\theta)u(t); \quad \text{(Eq. G)}$$

$$y(t) = C_c(\theta)x(t) + D_c(\theta)u(t); \quad \text{(Eq. H)}$$

where $$A_c(\theta) = \begin{bmatrix} -(\theta_1 + \theta_2 + \theta_3\theta_4) & \theta_2 & \theta_3\theta_4\theta_5 \\ \theta_6 & -\theta_6 & 0 \\ -1 & 0 & 0 \end{bmatrix},$$

$$B_c(\theta) = \begin{bmatrix} \theta_3\theta_4 & \theta_1 \\ 0 & 0 \\ 1 & 0 \end{bmatrix},$$

$$C_c(\theta) = \begin{bmatrix} 1 & 0 & 0 \\ -\theta_4 & 0 & \theta_5\theta_4 \end{bmatrix},$$

$$D_c(\theta) = \begin{bmatrix} 0 & 0 \\ \theta_4 & 0 \end{bmatrix};$$

$$\theta_1 = \frac{1}{C_{ia}R_{oi}};$$

$$\theta_2 = \frac{1}{C_{ia}R_{mi}};$$

$$\theta_3 = \frac{1}{C_{ia}};$$

$$\theta_4 = K_p;$$

$$\theta_5 = \frac{1}{\tau};$$

$$\theta_6 = \frac{1}{C_m R_{mi}};$$

and $$\dot{x}(t) = \begin{bmatrix} \dot{T}_{ia} \\ \dot{T}_m \\ \dot{I} \end{bmatrix};$$

$$x(t) = \begin{bmatrix} T_{ia} \\ T_m \\ I \end{bmatrix};$$

$$u(t) = \begin{bmatrix} T_{spj} \\ T_{oa} \end{bmatrix}.$$

As described in detail below, the controller 212 uses a two-step process to parameterize the system. In the first step, the controller 212 identifies the system parameters θ={$\theta_1$, $\theta_2$, $\theta_3$, $\theta_4$, $\theta_5$, $\theta_6$} (i.e., the values of $C_{ia}$, $C_m$, $R_{mi}$, $R_{oi}$, $K_{p,j}$, $K_{i,j}$). The disturbance state dis then introduced into the model and an Kalman estimator gain is added, such that in the second step the controller 212 identifies the Kalman gain parameters K. In some embodiments, the temperature setpoint $T_{sp}$ is not used as a system input, rather, $\dot{Q}_{HVAC}$ is used as a direct input for controller 212 in generating a control signal for the HVAC equipment 210.

As used herein, the term 'variable' refers to an item/quantity capable of varying in value over time or with respect to change in some other variable. A "value" as used herein is an instance of that variable at a particular time. A value may be measured or predicted. For example, the temperature setpoint $T_{sp}$ is a variable that changes over time, while $T_{sp}(3)$ is a value that denotes the setpoint at time step 3 (e.g., 68 degrees Fahrenheit). The term "predicted value" as used herein describes a quantity for a particular time step that may vary as a function of one or more parameters.

Controller for HVAC Equipment with System Identification

Figure 4:
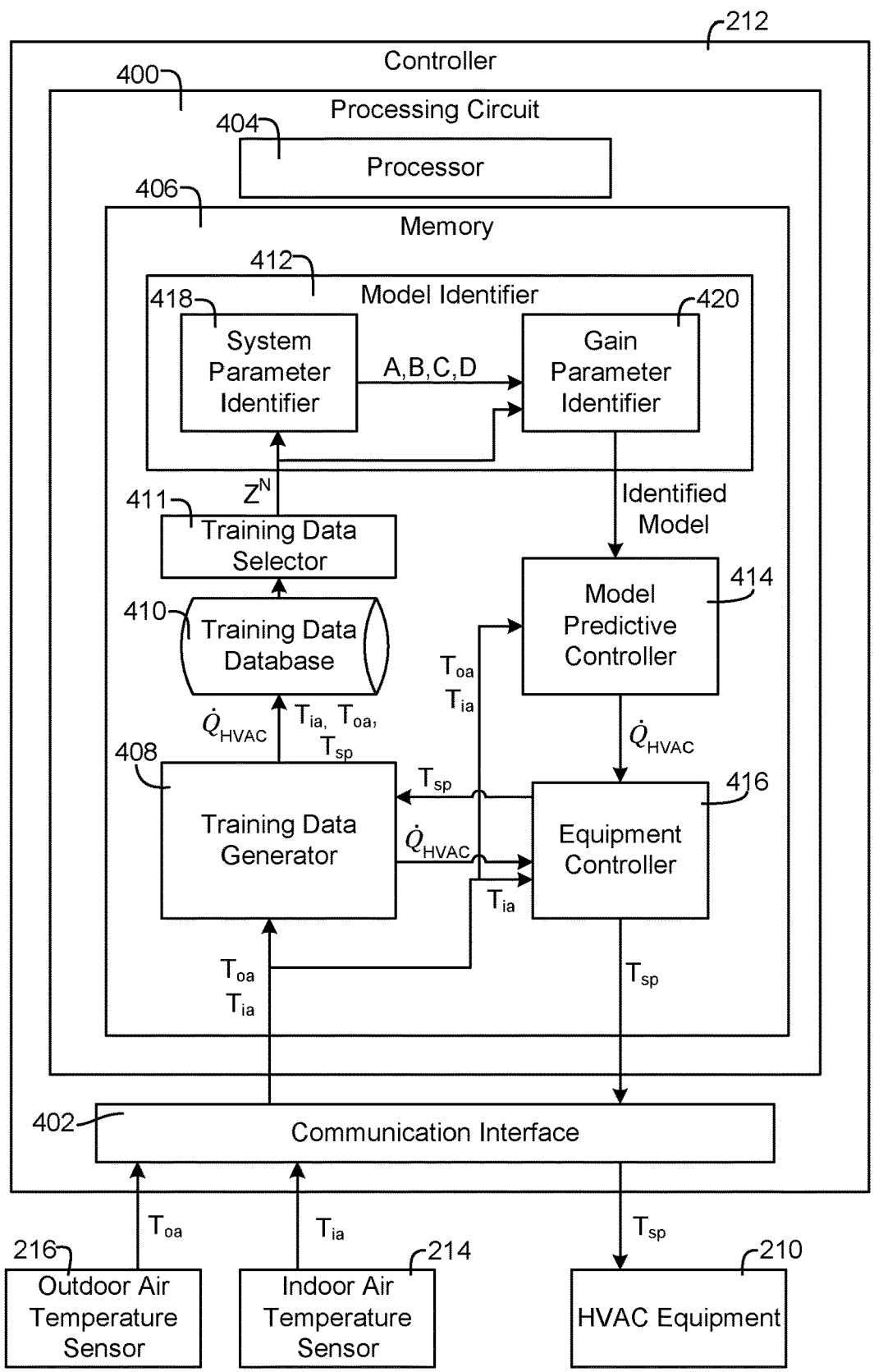
FIG. 4 is a block diagram of a controller for use with the HVAC system of FIG. 1, according to some embodiments.

Referring now to FIG. 4, a detailed diagram of the controller 212 is shown, according to an exemplary embodiment. The controller 212 includes a processing circuit 400 and a communication interface 402. The communication interface 402 is structured to facilitate the exchange of communications (e.g., data, control signals) between the processing circuit 400 and other components of HVAC system 100. As shown in FIG. 4, the communication interface 402 facilitates communication between the processing circuit 400 and the outdoor air temperature sensor 216 and the indoor air temperature sensor 214 to all temperature measurements $T_{oa}$ and $T_{ia}$ to be received by the processing circuit 400. The communication interface 402 also facilitates communication between the processing circuit 400 and the HVAC equipment 210 that allows a control signal (indicated as temperature setpoint $T_{sp}$) to be transmitted from the processing circuit 400 to the HVAC equipment 210.

The processing circuit 400 is structured to carry out the functions of the controller described herein. The processing circuit 400 includes a processor 404 and a memory 406. The processor 404 may be implemented as a general-purpose processor, an application-specific integrated circuit, one or more field programmable gate arrays, a digital signal processor, a group of processing components, or other suitable electronic processing components. The memory 406, described in detail below, includes one or more memory devices (e.g., RAM, ROM, NVRAM, Flash Memory, hard disk storage) that store data and/or computer code for facilitating at least some of the processes described herein. For example, the memory 406 stores programming logic that, when executed by the processor 404, controls the operation of the controller 212. More particularly, the memory 406 includes a training data generator 408, a training data database 410, a training data selector 411, a model identifier 412, a model predictive controller 414, and an equipment controller 416. The various generators, databases, identifiers, controllers, etc. of memory 406 may be implemented as any combination of hardware components and machine-readable media included with memory 406.

The equipment controller 416 is configured to generate a temperature setpoint $T_{sp}$ that serves as a control signal for the HVAC equipment 210. The equipment controller receives inputs of the indoor air temperature $T_{ia}$ from the indoor air temperature sensor 214 via the communication interface 402 and $\dot{Q}_{HVAC}$ from the model predictive controller 414 (during normal operation) and the training data generator 408 (during a training data generation phase described in detail below). The equipment controller uses $T_{ia}$ and $\dot{Q}_{HVAC}$ to generate $T_{sp}$ by solving Eq. A and Eq. B above for $T_{sp}$. The equipment controller 416 then provides the control signal $T_{sp}$ to the HVAC equipment 210 via the communication interface 402.

The model predictive controller 414 determines $\dot{Q}_{HVAC}$ based on an identified model and the temperature measurements $T_{ia}$, $T_{oa}$, and provides $\dot{Q}_{HVAC}$ to the equipment controller 416. The model predictive controller 414 follows a model predictive control (MPC) approach. The MPC approach involves predicting future system states based on a model of the system, and using those predictions to determine the controllable input to the system (here, $\dot{Q}_{HVAC}$) that bests achieves a control goal (e.g., to maintain the indoor air temperature near a desired temperature). A more accurate model allows the MPC to provide better control based on more accurate predictions. Because the physical phenomena that define the behavior of the system (i.e., of the indoor air 201 in the building 10) are complex, nonlinear, and/or poorly understood, a perfect model derived from first-principles is generally unachievable or unworkable. Thus, the model predictive controller 414 uses a model identified through a system identification process facilitated by the training data generator 408, the training data database 410, and the model identifier 412, described in detail below.

System identification, as facilitated by the training data generator 408, the training data database 410, and the model identifier 412, is a process of constructing mathematical models of dynamic systems. System identification provides a suitable alternative to first-principles-derived model when first principles models are unavailable or too complex for on-line MPC computations. System identification captures the important and relevant system dynamics based on actual input/output data (training data) of the system, in particular by determining model parameters particular to a building or zone to tune the model to the behavior of the building/zone. As described in detail below, the training data generator 408, the training data database 410, and the model identifier 412 each contribute to system identification by the controller 212.

The training data generator 408 is configured to generate training data by providing an excitation signal to the system. In some embodiments, the training data generator 408 provides various $\dot{Q}_{HVAC}$ values to the equipment controller 416 for a number N of time steps k, and receives the measured output response of the indoor air temperature $T_{ia}$ at each time step k from the air temperature sensor 214. The various $\dot{Q}_{HVAC}$ values may be chosen by the training data generator 408 to explore the system dynamics as much as possible (e.g., across a full range of possible $\dot{Q}_{HVAC}$ values, different patterns of $\dot{Q}_{HVAC}$ values, etc.). In some embodiments, the training data generator 408 provides various $T_{sp}$ values to the equipment controller 416 instead of the various values of $\dot{Q}_{HVAC}$. As on example, a pseudo-random binary signal may be used to generate the $\dot{Q}_{HVAC}$ values or $T_{sp}$ values to execute a training experiment. As another example, the training data generator 408 may be configure to provide persistent excitation in accordance with the disclosure of U.S. patent application Ser. No. 16/516,928, filed Jul. 19, 2019, the entire disclosure of which is incorporated by reference herein.

If the equipment controller 416 receives the various $\dot{Q}_{HVAC}$ values, various control inputs $T_{sp}$ can be generated in response. The temperature setpoint $T_{sp}$ for each time step k is provided to the HVAC equipment 210, which operates accordingly to heat or cool the zone 200 (i.e., to influence $T_{ia}$). In some embodiments, the temperature setpoints $T_{sp}$ are used by the training data generator 408 to be included in the training data. The training data generator receives an updated measurement of the indoor air temperature $T_{ia}$ for each time step k and may also receive the outdoor air temperature $T_{oa}$ for each time step k. The training data generator 408 thereby causes the states, inputs, and outputs of the system to vary across the time steps k and generates data corresponding to the inputs and outputs.

The inputs and outputs generated by the training data generator 408 are provided to the training data database 410. More particularly, in the nomenclature of the model of Eq. E and Eq.

F above, the training data generator 408 provides inputs $T_{sp}$ and $T_{oa}$ and outputs $\dot{Q}_{HVAC}$ and $T_{ia}$ for each time step k to the training data database 410.

The training data database 410 stores the inputs and outputs for each time step k provided by the training data generator 408. Each input and output is tagged with a time step identifier, so that data for the same time step can be associated together. The training data database 410 thereby collects and stores input and output data for each time step k, k 0, . . . , N, or, more specifically, $T_{sp}(k)$, $T_{oa}(k)$, $T_{ia}(k)$, and $\dot{Q}_{HVAC}(k)$, for k, k 0, . . . , N. This data is grouped together in the training data database 410 in a set of training data $Z^N$. In the notation of Eq. G and Eq. H, $Z^N$=[y(1), u(1), y(2), u(2), . . . , y(N),u(N)].

In the embodiments shown, the training data selector 411 is configured to determine one or more subsets of the training data for use in system identification. In some embodiments, the training data selector 411 is configured to execute process 900 of FIG. 9, which is explained in detail below with reference to FIG. 9.

The training data selector 411 is configured to divide the training data into multiple subsets corresponding to multiple time segments. Each time segment may correspond to a day, a half day, a week, etc. For example, the training data stored in the training data database 410 represents a week worth of data, the training data selector 411 can consider that as seven day-long segments of data. Each time segment may have a duration corresponding to a minimum test duration which includes a minimum amount of data (e.g., number of time steps) needed by the system identification process to properly identify a system model.

The training data selector 411 then performs multiple assessment (e.g., three assessments) for each of the time segments, in some embodiments. The multiple assessments include a first assessment of a correlation between temperature setpoints during the segment and measured temperatures during the segment (i.e., assessing how well-controlled the system is during the segment), a second assessment of an amount of time spent at a low load on the equipment during the segment (i.e., assessing whether sufficient time at higher loads is present), and a third assessment of the durations of intervals between setpoint changes during the segment (i.e., assessing whether a sufficient amount of proper-frequency excitations are present). Additional details are proved below. If a segment passes the plurality of assessments assessments, the segment is selected for use as part of a set of training data and is provided to the model identifier 412 in the set of training data $Z^N$. If a segment fails one or more of the assessments, the data for that segment is excluded from the set of training data $Z^N$ and not provided to the model identifier 412. Accordingly, the data used by the model identifier 412 as described below to identify a system model is selected to satisfy multiple criteria designed to ensure accuracy of the resulting system model.

In some embodiments, the training data selector 411 additionally or alternatively refines the training data using a saturation detection and removal process. System and methods for saturation detection and removal suitable for use to refine the training data $Z^N$ are described in U.S. patent application Ser. No. 15/900,459, filed Feb. 20, 2018, incorporated by reference herein in its entirety. For example, as described in detail therein, the training data may be filtered by determining whether the operating capacity is in a non-transient region for a threshold amount of a time period upon determining that an error for the building zone exists for the time period, and in response to a determination that the operating capacity is in the non-transient region for at least the threshold amount of the time period, indicating the time period as a saturation period.

Data from the saturation period can then be removed from the training data. The model identifier 412 accesses the training data database 410 to retrieve the training data $Z^N$ and uses the training data $Z^N$ to identify a model of the system. The model identifier 412 includes a system parameter identifier 418 and a gain parameter identifier 420. As shown in detail in FIG. 5 and discussed in detail with reference thereto, the system parameter identifier 418 carries out a first step of system identification, namely identifying the model parameters, while the gain parameter identifier 420 carries out the second step, namely determining a Kalman gain estimator. The model parameters and the Kalman gain estimator are included in an identified model of the system, and that model is provided to the model predictive controller 414. The model predictive controller can thus facilitate the control of the HVAC equipment 210 as described above.

Figure 5:
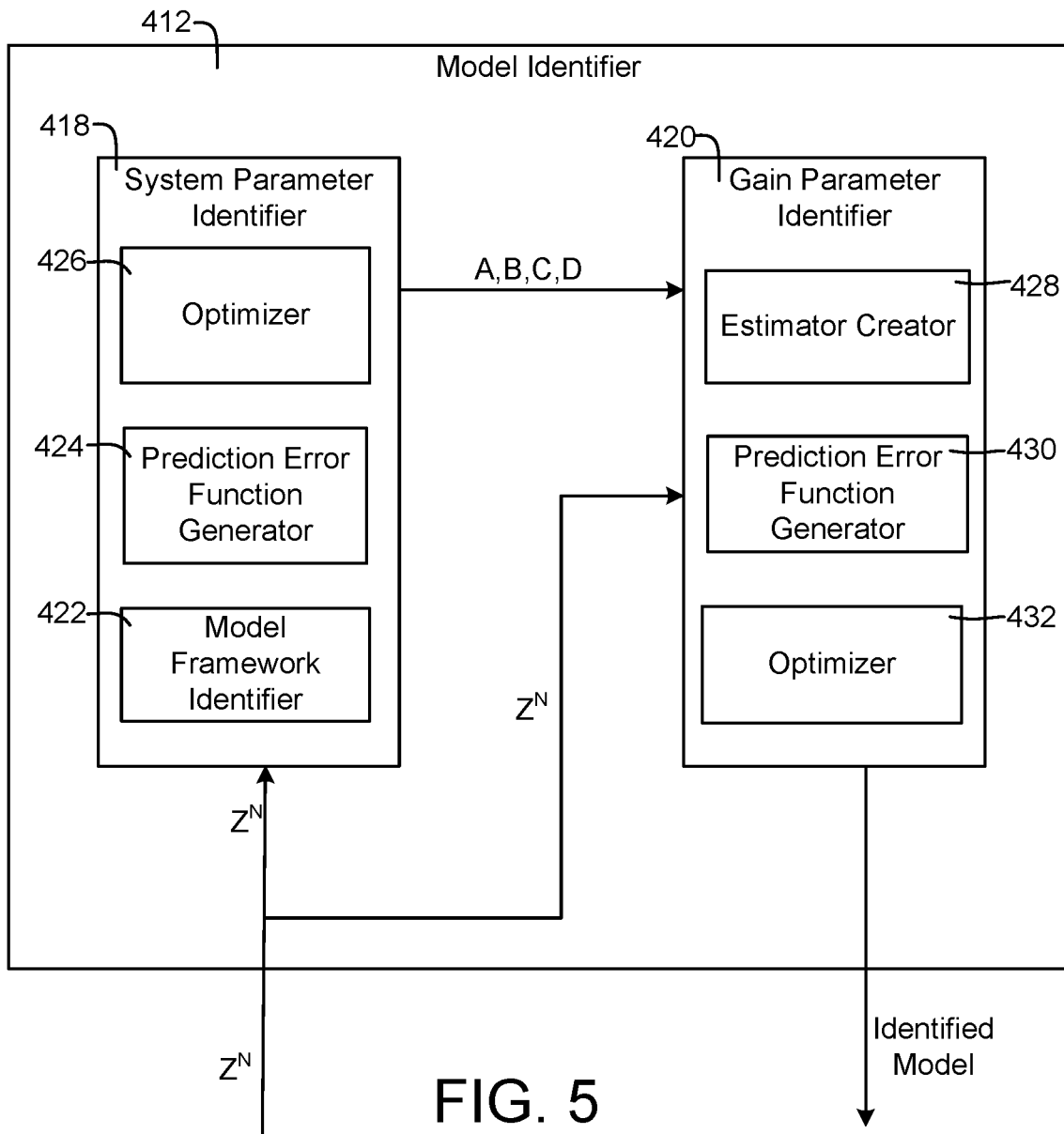
FIG. 5 is a detailed block diagram of a model identifier of the controller of FIG. 4, according to some embodiments.

Referring now to FIG. 5, a detailed view of the model identifier 412 is shown, according to an exemplary embodiment. As mentioned above, the model identifier 412 includes the system parameter identifier 418 and the gain parameter identifier 420. The system parameter identifier 418 is structured to identify the matrices A, B, C, D of Eqs. G and H, i.e., the values of $\theta=\{\theta_1, \theta_2, \theta_3, \theta_4, \theta_5, \theta_6\}$. In the embodiment described herein, this corresponds to finding the values of $C_{ia}$, $C_m$, $R_{mi}$, $R_{oi}$, $K_{p,j}$, and $K_{i,j}$.

The system parameter identifier 418 includes a model framework identifier 422, a prediction error function generator 424, and an optimizer 426. The model framework identifier 422 identifies that the model of the system, denoted as $M(\theta)$, corresponds to the form described above in Eqs. G and H, i.e., $$\dot{x}(t) = A_c(\theta)x(t) + B_c(\theta)u(t); \quad \text{(Eq. G)}$$

$$y(t) = C_c(\theta)x(t) + D_c(\theta)u(t); \quad \text{(Eq. H)}$$

The model framework identifier 422 thereby determines that the system parameter identifier 418 has the goal of determining a parameter vector $\hat{\theta}_N$ from the set of $\theta \in D_M \subset R^d$, where $D_M$ is the set of admissible model parameter values. The resulting possible models are given by the set: $M = \{M(\theta), \theta \in D_M\}$. The goal of the system parameter identifier 418 is to select a parameter vector $\hat{\theta}_N$ from among possible values of $\theta$ that best matches the model to the physical system (i.e., the vector $\theta$ is a list of variables and the vector $\hat{\theta}_N$ is a list of values), thereby defining matrices A, B, C, and D. The model framework identifier 422 also receives training data $Z^N$ and sorts the training data (i.e., $T_{sp}(k)$, $T_{oa}(k)$, $T_{ia}(k)$, and $\dot{Q}_{HVAC}(k)$, for k, k=0, . . . , N) into the notation of Eq. G-H as input/output data $Z^N = [y(1), u(1), y(2), u(2), \ldots, y(N), u(N)]$.

The prediction error function generator 424 receives the model framework $M = \{M(\theta), \theta \in D_M\}$ and the training data $Z^N$ from the model framework identifier 422. The prediction error function generator 424 applies a prediction error method to determine the optimal parameter vector $\hat{\theta}_N$. In general, prediction error methods determine the optimal parameter vector $\hat{\theta}_N$ by minimizing some prediction performance function $V_N(\theta, Z^N)$ that is based in some way on the difference between predicted outputs and the observed/measured outputs included in the training data $Z^N$. That is, the parameter estimation $\hat{\theta}_N$ is determined as:

$$\hat{\theta}_N = \hat{\theta}_N(Z^N) = arg \ min_{\theta \in D_M} V_N(\theta, Z^N).$$

The prediction error function generator 424 use one or more of several possible prediction error approaches to generate a prediction performance function $V_N(\theta, Z^N)$. In the embodiment shown, the prediction error function generator applies a simulation approach. In the simulation approach, the prediction error function generator 424 uses the model $M(\theta)$, the input trajectory $[u(1), u(2), \ldots, u(N)]$, and an initial state $x(\theta)$ to produce predicted outputs in terms of $\theta$. That is, the prediction error function generator 424 predicts:

$$[\hat{y}(1|0,\theta), \hat{y}(2|0,\theta) \ldots, \hat{y}(k|0,\theta) \ldots, \hat{y}(N|0,\theta)],$$

where $\hat{y}(k|0,\theta)$ denotes the predicted output at time step k given the training data from time 0 and the model $M(\theta)$. The prediction error function generator 424 then calculates a prediction error at each time step k is given by $\varepsilon(k,\theta) := y(k) - \hat{y}(k|0, \theta)$. The prediction error function generator 424 then squares the two-norm of each prediction error $\varepsilon(k,\theta)$ and sums the results to determine the prediction performance function, which can be written as:

$$V_N(\theta, Z^N) = \Sigma_{k=1}^N \|y(k) - \hat{y}(k|0,\theta)\|_2^2 \quad \text{(Eq. I)}.$$

In an alternative embodiment, the prediction error function generator 424 applies a one-step-ahead prediction error method to generate the prediction performance function $V_N(\theta, Z^N)$. In the one-step-ahead prediction error method, the prediction error function generator 424 uses past input-output data and the model $M(\theta)$ the model to predict the output one step ahead in terms of $\theta$. That is, in the one-step ahead prediction error method, the prediction error function generator 424 generates one-step ahead predictions $\hat{y}(k|k-1,\theta)$, which denotes the predicted output at time step k given the past input-output sequence $Z^{k-1}$ and using parameters $\theta$. The one-step ahead prediction $\hat{y}(k|k-1,\theta)$ is then compared to the measured output y(k) by the prediction error function generator 424 to determine the prediction error at k, defined as $\varepsilon(k,\theta) := y(k) - \hat{y}(k|k-1,\theta)$. The prediction error function generator 424 then squares the two-norm of the prediction errors for each k and sums the results, generating a prediction performance function that can be expressed in a condensed form as:

$$V_N(\theta, Z^N) = \frac{1}{N} \sum_{k=1}^N \|y(k) - \hat{y}(k|k-1, \theta)\|_2^2. \quad \text{(Eq. J)}$$

In other alternative embodiments, the prediction error function generator 424 uses a multi-step ahead prediction error approach to generate the prediction performance function. The multi-step ahead prediction error approach is described in detail below with reference to the gain parameter identifier 420 and FIGS. 7-8.

The prediction error function generator 424 then provides the performance function $V_N(\theta, Z^N)$ (i.e., from Eq. I or Eq. J in various embodiments) to the optimizer 426.

The optimizer 426 receives the prediction error function generated by the prediction error function generator 424 and optimizes the prediction error function in $\theta$ to determine $\hat{\theta}_N$. More specifically, the optimizer 426 finds the minimum value of the prediction error function $V_N(\theta, Z^N)$ as $\theta$ is varied throughout the allowable values of $\theta \in D_M$. That is, the optimizer 426 determines $\hat{\theta}_N$ based on:

$$\hat{\theta}_N = \hat{\theta}_N(Z^N) = arg \ min_{\theta \in D_M} V_N(\theta, Z^N).$$

The optimizer 426 then uses $\hat{\theta}_N$ to calculate the matrices A, B, C, and D. The system parameter identifier 418 then provides the identified matrices A, B, C, D to the gain parameter identifier 420.

The gain parameter identifier 420 receives the model with the matrices A, B, C, D (i.e., the model parameters) from system parameter identifier 418, as well as the training data $Z^N$ from the training data database 410, and uses that information to identify the gain parameters. The gain parameter identifier 420 includes an estimator creator 428, a prediction error function generator 430, and an optimizer 432.

The estimator creator 428 adds a disturbance model and introduces a Kalman estimator gain to account for thermal dynamics of the system, for example for the influence of $\dot{Q}_{other}$ on the system. The estimator creator 428 generates an augmented model with disturbance state d, given by:

$$\begin{bmatrix} \dot{x}(t) \\ \dot{d}(t) \end{bmatrix} = \begin{bmatrix} A_c & B_d \\ 0 & 0 \end{bmatrix} \begin{bmatrix} x(t) \\ d(t) \end{bmatrix} + \begin{bmatrix} B_c \\ 0 \end{bmatrix} u(t);$$

$$y(t) = [C_c \; C_d] \begin{bmatrix} x(t) \\ d(t) \end{bmatrix} + D_c u(t)$$

where the parameters $A_c$, $B_c$, $C_c$, and $D_c$ are the matrices A, B, C, D received from the system parameter identifier 418 and the disturbance model is selected with $$B_d = \frac{1}{C_{ia}}$$

and $$C_d = 0.$$

The estimator creator 428 then converts the model to a discrete time model, for example using 5-minute sampling periods, resulting in the matrices $A_{dis}$, $B_{dis}$, $C_{dis}$, $D_{dis}$ and the disturbance model discrete time matrix $B_{d_{dis}}$. The estimator creator 428 then adds a parameterized estimator gain, resulting in the following model:

$$\begin{bmatrix} \hat{x}(t+1|t) \\ \hat{d}(t+1|t) \end{bmatrix} = \begin{bmatrix} A_{dis} & B_{d_{dis}} \\ 0 & I \end{bmatrix} \begin{bmatrix} \hat{x}(t|t-1) \\ \hat{d}(t|t-1) \end{bmatrix} + \begin{bmatrix} B_{dis} \\ 0 \end{bmatrix} u(t) + \underbrace{\begin{bmatrix} K_x(\phi) \\ K_d(\phi) \end{bmatrix}}_{=:K(\phi)} (y(t) - \hat{y}(t|t-1));$$ (Eq. K)

$$\hat{y}(t|t-1) = [C_{dis} \; 0] \begin{bmatrix} \hat{x}(t|t-1) \\ \hat{d}(t|t-1) \end{bmatrix} + D_{dis} u(t).$$ (Eq. L)

The matrix $K(\phi)$ is the estimator gain parameterized with the parameter vector $\phi$ where:

$$K_x(\phi) = \begin{bmatrix} \phi_1 & \phi_2 \\ \phi_3 & \phi_4 \\ \phi_5 & \phi_6 \end{bmatrix};$$

$$K_d(\phi) = [\phi_7 \; \phi_8].$$

In this notation, $\hat{x}(t+1|t)$ is an estimate of the state at time t+1 obtained using the Kalman filter and made utilizing information at sampling time t. For example, with a sampling time of five minutes, $\hat{x}(t+1|t)$ is an estimate of the state five minutes after the collection of the data that the estimate is based on. The goal of the gain parameter identifier is to identify parameters $\hat{\phi}_N$ (i.e., a vector of for each of $\phi_1 \ldots \phi_8$) that make the model best match the physical system.

The estimator creator 428 then provides the discrete time model with estimator gain (i.e., Eqs. K-L) to the prediction error function generator 430. The prediction error function generator receives the model from the estimator creator 428 as well as the training data $Z^N$ from the training data database 410, and uses the model (with the estimator gain) and the training data $Z^N$ to generate a prediction performance function.

Figure 7:
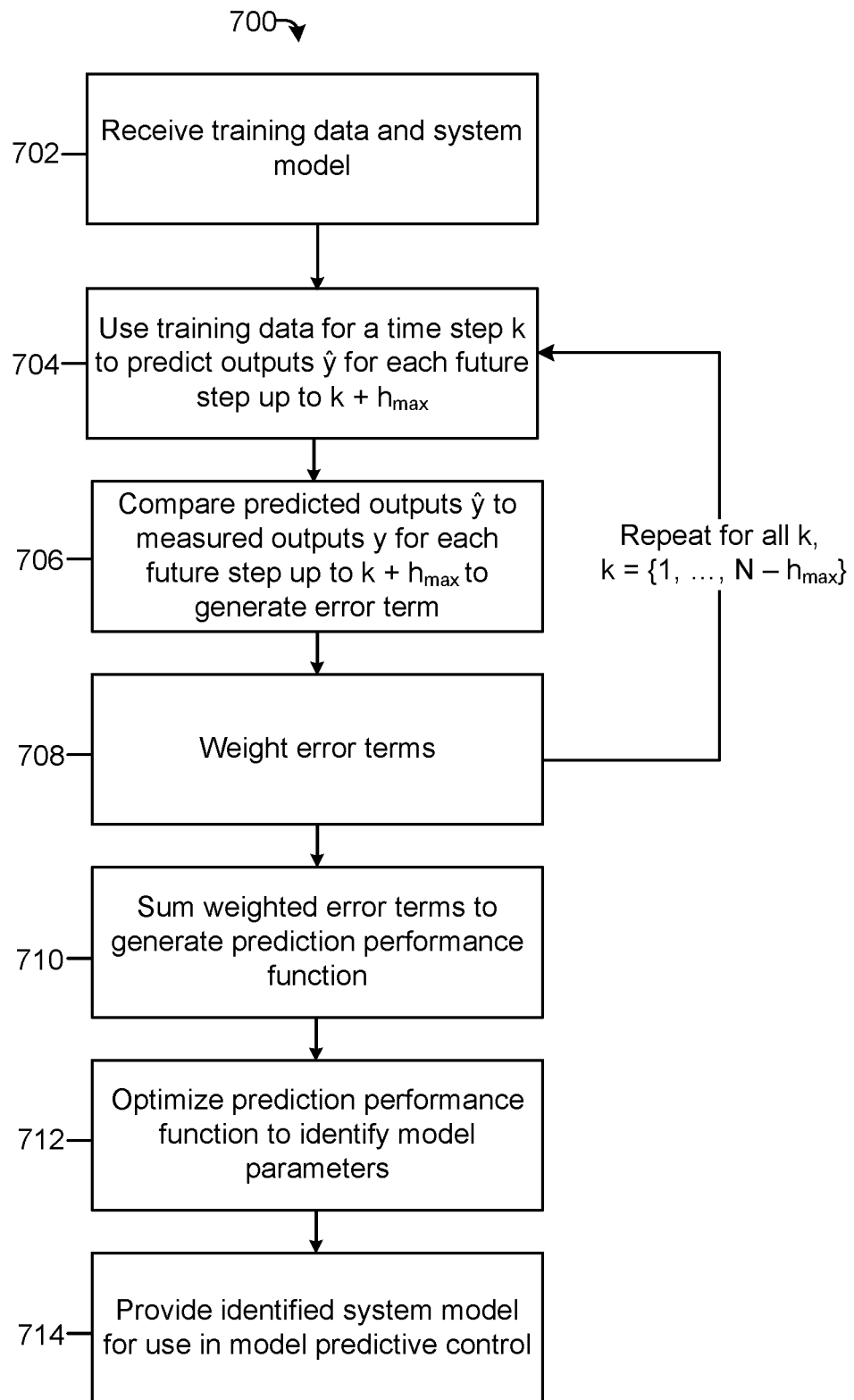
FIG. 7 is a flowchart of a multi-step ahead prediction error method for use in system identification, according to some embodiments.
Figure 8:
FIG. 8 is a visualization to aid explanation of the multi-step ahead prediction error method shown in FIG. 7, according to some embodiments.

The prediction error function generator 430 follows a multi-step ahead prediction error method to generate a predication performance function $V_N(\phi, Z^N)$. The multi-step ahead prediction error method is illustrated in FIGS. 7-8 and described in detail with reference thereto. As an overview, in the multi-step-ahead prediction error method, the prediction error function generator 430 uses past input-output data and the model $M(\theta)$ the model to predict the output multiple step ahead in terms of $\phi$. That is, in the multi-step ahead prediction error method, the prediction error function generator 430 generates multi-step ahead predictions $\hat{y}(k+h|k-1,\phi)$, which denotes the predicted output at time step k+h given the past input-output sequence $Z^{k-1}$ and using parameters $\phi$. The index h corresponds the number of steps ahead the prediction is made, and for each time step k predictions are made for h=0, ..., $h_{max}$ (i.e., when h=2, the prediction is three steps ahead because h is indexed from zero).

Each multiple multi-step ahead prediction $\hat{y}(k+h|k-1,\phi)$ is then compared to the corresponding measured output y(k) by the prediction error function generator 430 to determine the prediction error at k, defined as $\varepsilon(k,\theta):=y(k)-\hat{y}(k+h|k-1,\phi)$. The prediction error function generator 430 then squares the two-norm of the prediction errors for each k and sums the results, in some embodiments using an weighting function w(h). The prediction error function generator 430 thereby generates a prediction performance function that can be expressed in a condensed form as:

$$V_N(\phi, Z^N) = \sum_{k=1}^{N-h_{max}+1} \sum_{h=0}^{h_{max}} w(h) \|y(k+h) - \hat{y}(k+h|k-1, \phi)\|_2^2.$$ (Eq. M).

The multi-step ahead prediction error method is described in more detail below with reference to FIGS. 7-8. In alternative embodiments, the prediction error function generator 430 follows the simulation approach or the one-step ahead prediction error approach discussed above with reference to the prediction error function generator 424.

The prediction error function generator 430 then provides the prediction performance function (i.e., Eq. M) to the optimizer 432. The optimizer 432 receives the prediction error function $V_N(\phi, Z^N)$ generated by the prediction error function generator 430 and optimizes the prediction error function in $\phi$ to determine $\hat{\phi}_N$. More specifically, the optimizer 426 finds the minimum value of the prediction error function $V_N(\phi, Z^N)$ as $\phi$ is varied throughout the allowable values of $\phi$. In some cases, all real values of $\phi$ are allowable. That is, the optimizer 426 determines $\hat{\phi}_N$ based on:

$$\hat{\phi}_N = \hat{\phi}_N(Z^N) = \arg\min_\phi (V_N(\phi, Z^N)).$$

The optimizer 432 then uses $\hat{\phi}_N$ to calculate the matrices $K_x(\phi)$ and $K_d(\phi)$, resulting in a fully identified model. The gain parameter identifier 420 provides the identified model to the model predictive controller 414.

In some embodiments, the prediction error function generator 430 reconfigures the multi-step ahead prediction problem by defining augmented vectors that allow the multi-step ahead prediction performance function (Eq. M) to be recast in an identical structure to the single-step ahead prediction performance function (Eq. J). Existing software toolboxes and programs (e.g., Matlab system identification toolbox) configured to handle the single-step ahead prediction error approach can then be used to carry out the multi-step ahead prediction error approach. To reconfigure the problem for that purpose, the prediction error function generator 430 considers, the system model of the form:

$$x(k+1) = Ax(k) + Bu(k);$$

$$y(k) = Cx(k) + Du(k).$$

where the one-step prediction of x(k+1|k) using a steady-state Kalman gain is:

$$\hat{x}(k+1|k) = A\hat{x}(k|k-1) + Bu(k) + K(y(k) - C\hat{x}(k|k-1) - Du(k));$$

$$\hat{y}(k|k-1) = C\hat{x}(k|k-1) + Du(k).$$

In the multi-step prediction Kalman gain system identification problem, the complete pattern of the algebraic manipulations is shown by the 4-step prediction. The prediction error function generator 430 considers a case with four input data points and four output data-points starting from time h=0 to time h=3, so that $h_{max}=3$. The one-step prediction (with the prediction error function generator 430 given x0) is given by the equation:

$$\hat{x}(1|0) = Ax0 + Bu(0) + K(y(0) - Cx0 - Du(0));$$

$$\hat{y}(0|0) = Cx0 + Du(0).$$

The prediction of the second step is $$\hat{x}(2|0) = A\hat{x}(1|0) + Bu(1) = A(Ax0 + Bu(0) + K(y(0) - Cx0 - Du(0))) + Bu(1);$$

$$\hat{y}(1|0) = C\hat{x}(1|0) + Du(1) = C(Ax0 + Bu(0) + K(y(0) - Cx0 - Du(0))) + Du(1).$$

The prediction of the third step is $$\hat{x}(3|0) = A\hat{x}(2|0) + Bu(2) = A(A(Ax0 + Bu(0) + K(y(0) - Cx0 - Du(0))) + Bu(1)) + Bu(2);$$

$$\hat{y}(2|0) = C\hat{x}(2|0) + Du(2) = C(A(Ax0 + Bu(0) + K(y(0) - Cx0 - Du(0))) + Bu(1)) + Du(2).$$

The forth step prediction is $$\hat{x}(4|0) = A\hat{x}(3|0) + Bu(3) = A\,A(A(Ax0 + Bu(0) + K(y(0) - Cx0 - Du(0))) + Bu(1)) + Bu(2)) + Bu(3);$$

$$\hat{y}(3|0) = C\hat{x}(3|0) + Du(3) = C(A(A(Ax0 + Bu(0) + K(y(0) - Cx0 - Du(0))) + Bu(1)) + Bu(2)) + Du(3).$$

With these 4-step predictions, the pattern needed to cast the multi-step prediction problem as a 1-step prediction is revealed. By aggregating the matrices multiplying x0, y(0), u(0), u(1), u(2), and u(3), the pattern revealed is:

$$\hat{x}(1|0) = Ax0 + Bu(0) + K(y(0) - Cx0 - Du(0));$$

$$\hat{x}(2|0) = (A^2 - AKC)x0 + (AB - AKD)u(0) + Bu(1) + AKy(0);$$

$$x(3|0) = (A^3 - A^2KC)x0 + (A^2B - A^2KD)u(0) + ABu(1) + Bu(2) + A^2Ky(0);$$

$$\hat{x}(4|0) = (A^4 - A^3KC)x0 + (A^3B - A^3KD)u(0) + A^2Bu(1)ABu(2) + Bu(3) + A^3Ky(0);$$

$$\hat{y}(0) = Cx0 + Du(0);$$

$$\hat{y}(1|0) = (CA - CKC)x0 + (CB - CKD)u(0) + Du(1) + CKy(0);$$

$$\hat{y}(2|0) = (CA^2 - CAKC)x0 + (CAB - CAKD)u(0) + CBu(1) + Du(2) + CAKy(0);$$

$$\hat{y}(3|0) = (CA^3 - CA^2KC)x0 + (CA^2B - CA^2KD)u(0) + CABu(1) + CBu(2) + Du(3) + CA^2Ky(0).$$

Based on that pattern, the prediction error function generator 430 defines the following vectors:

$$\tilde{u}(0) = \begin{bmatrix} u(0) \\ u(1) \\ u(2) \\ u(3) \\ y(0) \end{bmatrix},\ \tilde{\hat{y}}(0) = \begin{bmatrix} \hat{y}(0) \\ \hat{y}(1|0) \\ \hat{y}(2|0) \\ \hat{y}(3|0) \end{bmatrix},\ \tilde{y}(0) = \begin{bmatrix} y(0) \\ y(1) \\ y(2) \\ y(3) \end{bmatrix},$$

$\hat{x}(1|0)$ and x0 remain unchanged.

The new system that has the 4-step prediction casted into a one-step prediction which can be analyzed by the prediction error function generator 430 using an existing system identification software product as:

$$\hat{x}(1|0) = Ax0 + [B000]\tilde{u}(0) + [K000](\tilde{y}(0) - \tilde{\hat{y}}(0);$$

$$\tilde{\hat{y}}(0) = \begin{bmatrix} C \\ (CA - CKC) \\ (CA^2 - CAKC) \\ (CA^3 - CA^2KC) \end{bmatrix} x0 +$$

$$\begin{bmatrix} D & 0 & 0 & 0 & 0 \\ (CB - CKD) & D & 0 & 0 & CK \\ (CAB - CAKD) & CB & D & 0 & CAK \\ (CA^2B - CA^2KD) & CAB & CB & D & CA^2K \end{bmatrix} \tilde{\hat{y}}(0).$$

In order to have the general formulation at time k for predicting $h_{max}$ step ahead in time, this four-step example can be extrapolated to define the general augmented input and output vectors as:

$$\tilde{\hat{y}}(k) = \begin{bmatrix} C \\ (CA - CKC) \\ (CA^2 - CAKC) \\ \vdots \\ (CA^{h_{max}} - CA^{h_{max}-1}KC) \end{bmatrix} \hat{x}(k|k-1) +$$

$$\begin{bmatrix} D & 0 & 0 & 0 & 0 & 0 \\ (CB - CKD) & D & 0 & 0 & 0 & CK \\ (CAB - CAKD) & CB & D & 0 & 0 & CAK \\ (CA^2B - CA^2KD) & CAB & \ddots & \ddots & 0 & 0 & CA^2K \\ \vdots & & & \ddots & CB & D & \vdots \\ (CA^{h_{max}-1}B - CA^{h_{max}-1}KD) & CA^{h_{max}-2}B & \cdots & CAB & CB & D & CA^{h_{max}-1}K \end{bmatrix} \tilde{u}(k);$$

-continued $$\tilde{u}(k) = \begin{bmatrix} u(k) \\ u(k+1) \\ \vdots \\ u(k+h_{max}) \end{bmatrix},$$

$$\tilde{\hat{y}}(k) = \begin{bmatrix} \hat{y}(k \mid k-1) \\ \hat{y}(k+1 \mid k-1) \\ \vdots \\ \hat{y}(k+h_{max} \mid k-1) \end{bmatrix},$$

$$\tilde{y}(k) = \begin{bmatrix} y(k) \\ y(k+1) \\ \vdots \\ y(k+h_{max}) \end{bmatrix}.$$

With these definition, the general formulation at time k for predicting $h_{max}$ steps ahead in time is:

$$\hat{x}(k+1|k) = A\hat{x}(k|k-1) + [B0 \ldots 0]\tilde{u}(k) + [K0 \ldots 0](\tilde{y}(k) - \tilde{\hat{y}}(k)).$$

As described above, in the multi-step ahead prediction error method the prediction error function generator 430 generates a function of the form:

$$V_N(\phi, Z^N) = \sum_{k=1}^{N-h_{max}+1} \sum_{h=0}^{h_{max}} w(h) \|y(k+h) - \hat{y}(k+h \mid k-1, \phi)\|_2^2. \quad \text{(Eq. M)}$$

If $w(h) \equiv 1$ for all h, and using the augmented input and output vectors defined above, the multi-step ahead prediction performance function can be reconfigured into the following one-step ahead prediction performance function by the prediction error function generator 430:

$$V_N(\theta, Z^N) = V_N(\theta, Z^N) = \sum_{k=1}^{N-h_{max}+1} \|\tilde{y}(k) - \tilde{\hat{y}}(k, \theta)\|_2^2$$

The prediction error function generator 430 then uses this reconfigured format of the prediction performance function with existing software toolboxes suited for the one-step ahead prediction error approach. The prediction error function generator 430 may include machine-readable media storing computer code executable to apply such software.

System Identification Methods

Figure 6:
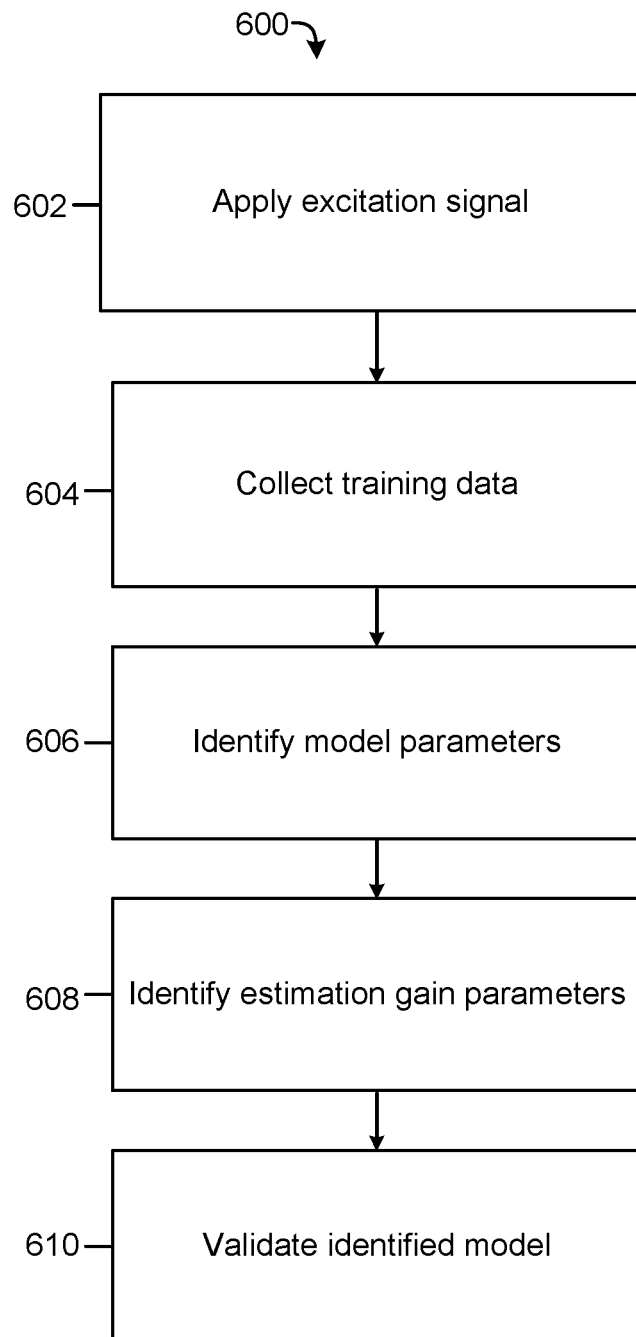
FIG. 6 is flowchart of a process for system identification, according to some embodiments.

Referring now to FIG. 6, a flowchart of a process 600 for system identification is shown, according to an exemplary embodiment. The process 600 can be carried out by the controller 212 of FIGS. 2 and 4.

At step 602, the controller 212 applies an excitation signal to the HVAC equipment 210. For example, the training data generator 408 may vary the $\dot{Q}_{HVAC}$ values supplied to the equipment controller 416, causing an excitation signal to be generated in the temperature setpoint $T_{sp}$ inputs provided to the HVAC equipment 210. In general, the excitation signal is designed to test the system in a way to provide robust data for use in system identification.

At step 604, training data is collected and stored by the controller 212. Training data includes measureable temperature readings, i.e., $T_{oa}$ and $T_{ia}$, controller-determined values $\dot{Q}_{HVAC}$ and $T_{sp}$ for each of a plurality of time steps k, k=0, . . . , N. The training data therefore includes inputs u(k) and the outputs y(k) for the time period. The training data is received from temperature sensors 214, 216, training data generator 408, and/or equipment controller 416 and stored in training data database 410.

At step 606, the controller 212 identifies the model parameters for the system. That is, as discussed in detail above, the controller 212 determines the matrices A(θ), B(θ), C(θ), and D(θ) that minimize a prediction performance function $V_N(Z^N, \theta)$ for the model:

$$\dot{x}(t) = A_c(\theta)x(t) + B_c(\theta)u(t); \quad \text{(Eq. G)}$$

$$y(t) = C_c(\theta)x(t) + D_c(\theta)u(t); \quad \text{(Eq. H)}.$$

In identifying the model parameters, a simulation approach or a one-step-ahead prediction error approach is followed in some embodiments. These approaches are described in detail above with reference to the prediction error function generator 424 of FIG. 5. In other embodiments, the model parameters are determined at step 606 using a multi-step ahead prediction error method, described in detail with reference to FIGS. 7-8.

At step 608, the controller 212 identifies the gain estimator parameters. That is, the controller 212 determines the matrices $K_x$ and $K_d$ of Eq. K above. In preferred embodiments, the controller 212 uses the multi-step ahead prediction error method to find the matrices $K_x$ and $K_d$. The multi-step ahead prediction error method is described in detail below with reference to FIGS. 7-8. In alternative embodiments, a simulation approach or a one-step-ahead prediction error approach is followed to find the matrices $K_x$ and $K_d$.

At step 610, the identified model is validated by the controller 212. The controller 212 uses the identified model to generate control signal inputs $T_{sp}$ for the HVAC equipment 210 using model predictive control. The controller then monitors the temperature measurements $T_{oa}$ and $T_{ia}$ from temperature sensors 214, 216, the input $T_{sp}$, and the value $\dot{Q}_{HVAC}$ to determine how well the model matches system behavior in normal operation. For example, the training data database 410 may collect and store an addition set of training data that can be used by the model identifier 412 to validate the model. If some discrepancy is determined, the identified model may be updated. The identified model can thereby by dynamically adjusted to adjust for changes in the physical system.

Referring now to FIGS. 7-8 the multi-step ahead prediction error approach for use in system identification is illustrated, according to an exemplary embodiment. In FIG. 7, a flowchart of a process 700 for identifying system parameters using the multi-step ahead prediction error approach is shown, according to an exemplary embodiment. FIG. 8 shows an example visualization useful in explaining process 700. Process 700 can be carried out by the system parameter identifier 418 and/or the gain parameter identifier 420 of FIG. 5. In the embodiment described herein, the process 700 is implemented with the gain parameter identifier 420.

Process 700 begins at step 702, where the gain parameter identifier 420 receives training data $Z^N=[y(1), u(1), y(2), u(2), \ldots, y(N), u(N)]$ from the training data database 410. The training data includes measured outputs y(k) (i.e., $T_{ia}(k)$ and $\dot{Q}_{HVAC}(k)$) and inputs u(k) (i.e., $T_{oa}(k)$ and $T_{sp}(k)$) for each time step k, k=1, ..., N. N is the number of samples in the training data. The gain parameter identifier 420 also receives the system model from the system parameter identifier 418. The training data $Z^N$ can be selected by the training data selector 411, for example according to process 900 described in detail below. Although the notation $Z^N=[y(1), u(1), y(2), u(2), \ldots, y(N), u(N)]$ suggests that continuous or sequential time steps are chosen, various embodiment herein are also configured to provide and handle scenario where the training data represents separate time segments (e.g., separated in time from one another).

At step 704, the prediction error function generator 430 uses the training data for a time step k to predict outputs y for each subsequent time step up to $k+h_{max}$. The value $h_{max}$ corresponds to the number of steps ahead the predictions are made, referred to herein as the prediction horizon. Because $h_{max}$ is indexed from zero in Eq. M above, the prediction horizon is one more than the value of $h_{max}$. For example, in the case shown in FIG. 8 and described below, predictions are made three steps ahead, corresponding to $h_{max}=2$ in the notation of Eq. D and a prediction horizon of three. The prediction horizon may be any integer greater than one, for example four or eight. The prediction horizon can be tuned experimentally, to determine an ideal prediction horizon. For example, too long of a prediction horizon may lead to poor prediction while too short of a prediction horizon may suffer the same limitations as the one-step ahead prediction error method mentioned above. In some cases, a prediction horizon of eight is preferred.

More specifically, at each step 704 the predicted outputs $[\hat{y}(k|k-1), \hat{y}(k+1|k-1), \ldots \hat{y}(k+h_{max}|k-1)]$ are predicted based on the past training data (i.e., through step k–1), denoted as $Z^{k-1}$, along with future inputs $[u(k), u(k+1) \ldots u(k+h_{max})]$. These predictions are made using the model M(ϕ), such that predicted outputs ŷ depend on ϕ.

To illustrate the predictions of step 704, FIG. 8 shows a simplified visualization in which y(k) and ŷ(k) are depicted as scalar values for the sake of simplified explanation. In FIG. 8, the graph 800 plots the values of y and y over time t for five time steps past a starting time t=0. The solid circles 802 represent measured outputs y(t) from the training data. The unfilled boxes 804 represent predicted outputs ŷ(t|0), that is, the outputs predicted for each time step based on the input/output data available at time t=0 (e.g., y(0)). The dashed lines represent the propagation of the predictions; for example, graph 800 includes three unfilled boxes 804 connected by a dashed line to the solid circle 802 corresponding to y(0). This shows that the predictions ŷ(t|0), 1≤t≤3, represented by the unfilled boxes 804 were based on the measured value of y(0).

At step 706, the prediction error function generator 430 compares the predicted outputs ŷ to the measured outputs y for each future step up to $k+h_{max}$ (i.e., for all predicted outputs ŷ generated at step 704). More specifically, an error term for each step may be defined as y(k+h)–ŷ(k+h|k–1,ϕ). Because y and ŷ are vectors, the two-norm of this error term may be taken and squared to facilitate comparison between prediction errors as scalars, such that the error term becomes $\|y(k+h)-\hat{y}(k+h|k-1,\phi)\|_2^2$. This term appears in Eq. M above.

As shown in FIG. 8, step 706 can be understood as measuring the distance between, for example, each unfilled box 804 and the corresponding solid circle 802 (i.e., the unfilled box 804 and the solid circle 802 at the same time t). Thus, in the example of FIG. 8, step 706 includes calculating three error terms.

At step 708, the error terms are weighted based on a weighting function w(h). The weighting function w(h) allows the prediction errors to be given more or less weight depending on how many steps ahead the prediction is. The weighting function w(h) is preferably a monotonically decreasing function of h, so that farther-out-in-time predictions have less influence on the prediction error. In some embodiments, the weighting function w(h)=1. Step 708 thereby corresponds the w(h) term in Eq. M above.

The process 700 then returns to step 704 to repeat steps 704-706 for each value of k, k=1, N–$h_{max}$. As illustrated in FIG. 8, repeating step 704 corresponds to generating the predictions represented by the unfilled circles 808 and the unfilled triangles 810. The unfilled circles 808 chart the predictions based on the output data available at time t=1, i.e., ŷ(t|1), for t=2, 3, 4. The unfilled triangles chart the predictions based on the output data available at time t=2, i.e., ŷ(t|2), for t=3, 4, 5. Process 700 therefore involves making multiple predictions for most time steps: for example, FIG. 8 shows three separate predictions for time t=3.

At step 706, the prediction error function generator 430 again compares the predicted outputs y for the new value of k to the measured outputs y for each future step up to $k+h_{max}$ to define the error term $\|y(k+h)-\hat{y}(k+h|k-1, 0)\|_2^2$ as included in Eq. M. At step 708, the terms are again weighted by the weighting function w(h). The weighting function w(h) may be the same for each k.

In the notation of Eq. M, each iteration of steps 704-708 thus corresponds to steps necessary to generate the values used by the inner (right) summation indexed in h, while repetition of the steps 704-708 corresponds to the iteration through k represented in the outer (left) summation. At step 710, then, these summations are executed. In other words, the system identification circuit 108 sums the weighted error terms generated by steps 704-708 to generate a prediction performance function as:

$$V_N(\theta, Z^N) = \sum_{k=1}^{N-h_{max}+1} \sum_{h=0}^{h_{max}} w(h)\|y(k+h) - \hat{y}(k+h|k-1, \phi)\|_2^2. \quad \text{(Eq. M)}$$

The prediction performance function is a function of the input data $Z^N$ and the parameter variable ϕ. Typically, the input data $Z^N$ is given (i.e., received by the model identifier 412 and used in the calculation of error terms as described above). Thus, the prediction performance function is primarily a function of $\phi$.

At step 712, the prediction performance function $V_N(\phi, Z^N)$ is minimized to find an optimal parameter vector $\hat{\theta}_N = \arg\min_{\theta \in D_M} V_N(\phi, Z^N)$. Any minimization procedure may be followed. The result of step 712 is a vector $\hat{\phi}_N$ of identified model parameters that tune the model $M(\hat{\phi}_N)$ to accurately predict system evolution multiple steps ahead. At step 714, the model identifier 412 provides the identified system model (i.e., $M(\hat{\phi}_N)$) to the model predictive controller 414 for use in generating control inputs for the HVAC equipment 210.

According to various embodiments, process 700 is run once at set-up to establish the system model, run periodically to update the system model, or run repeatedly/continuously to dynamically update the system model in real time.

Figure 9:
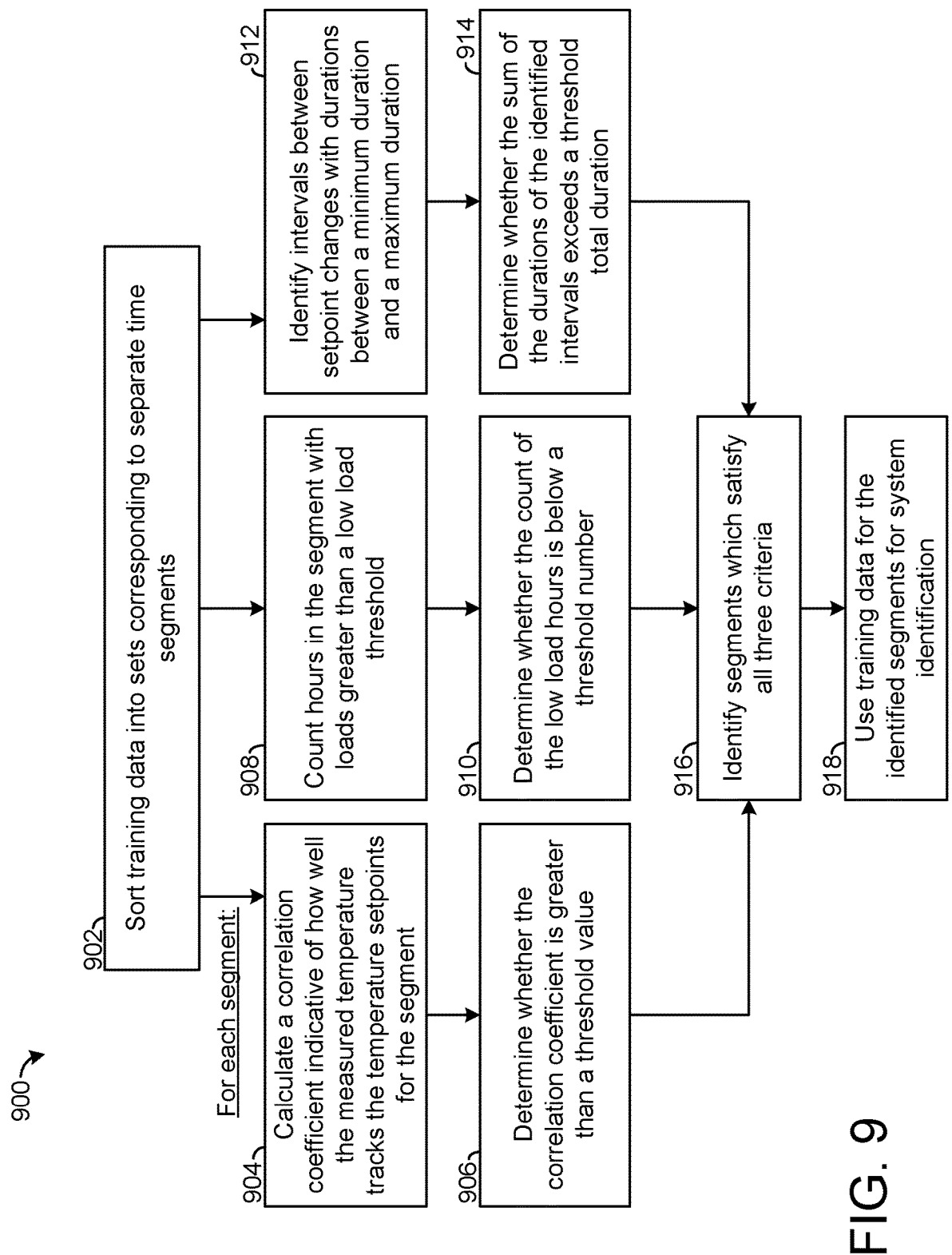
FIG. 9 is a flowchart of a process for selecting training data for use in system identification, according to some embodiments.

Referring now to FIG. 9, a flowchart of a process 900 for selecting training data for use in training the system model is shown, according to an exemplary embodiment. The process 900 can be executed by the controller 212 of FIG. 4, in particular by the processor 404 executing program instructions stored in the memory 406 (e.g., at training data selector 411). The process 900 outputs selected training data which can be provided at step 702 of FIG. 7 to initiate the process 700 described above.

At step 902, a collection of stored training data is sorted into sets corresponding to separate time segments. Each time segment may correspond to a day, a half day, a week, etc. For example, in an example where the training data stored in the training data database 410 represents a week worth of data, the training data selector 411 can consider that as seven day-long segments of data. Each time segment may have a duration corresponding to a minimum test duration which includes a minimum amount of data (e.g., number of time steps) needed by the system identification process to properly identify a system model. The training data can include a zone setpoint temperature $T_{sp}$ (e.g., units of degrees Celsius, degrees Fahrenheit, degrees Kelvin) and associated time stamp, a zone indoor air temperature $T_{ia}$ (e.g., units of degrees Celsius, degrees Fahrenheit, degrees Kelvin) and associated time stamp, and heat provided by the HVAC system $\dot{Q}_{HVAC}$ (e.g., units of kilowatt) and associated time stamp, for each of many time steps indicated by different time stamps.

The process 900 then includes performance of multiple (e.g., three, fourth) assessments (tests, checks, etc.) for each of the multiple segments. This includes a first assessment (shown as steps 904 and 906) of a correlation between temperature setpoints and measured temperatures, a second assessment (shown as steps 908 and 910) of time spend at low load, and a third assessment (shown as steps 912 and 914) of the frequency of excitations of the system based on durations of intervals between setpoint changes. These steps are performed for each segment of the training data identified at step 902.

Steps 904 and 906 are executed to provide the first assessment, which corresponds to a correlation criterion. At step 904, a correlation coefficient is calculated which is indicative of how well the measured temperature tracks the time-varying temperature setpoint for the segment.

In some embodiments, the correlation coefficient of the two variables is a measure of their linear dependence, which is an indicator showing if the system is under control. For example, the following formulation can be used:

$$\rho(T_{sp}, T_{ia}) = \frac{\text{cov}(T_{sp}, T_{ia})}{\sigma_{T_{sp}} \sigma_{T_{ia}}}$$

where $\rho(T_{sp}, T_{ia})$ is the correlation coefficient, $\text{cov}(T_{sp}, T_{ia})$ is covariance of setpoint $T_{sp}$ and indoor air temperature $T_{ia}$, $\sigma_{T_{sp}}$ and $\sigma_{T_{ia}}$ are the standard deviation of $T_{sp}$ and $T_{ia}$ segment respectively. In this example, this formula is applied to the training data for the segment to calculate the correlation coefficient. Variations of this formulation are possible in various embodiments to calculate correlation coefficients.

At step 906, the correlation coefficient is compared to a threshold value. In the example formulation above, the correlation coefficient can have values between 0 and 1, where a higher correlation coefficient indicates a higher degree of correlation between the temperature setpoint and the measured air temperature, thereby indicating that the system is better under control, whereas a lower correlation coefficient indicates that the measured air temperature is not tracking the setpoint as well and that the system is less controlled. A threshold value is predetermined (preprogrammed, preset) which indicates a sufficient level of correlation between the temperature setpoint and the measured air temperature for providing quality data. For example, a threshold value in a range between approximately 0.6 and 0.8 may be used as the threshold value, for example 0.7. If the correlation coefficient is less than the threshold value, the segment is considered to have failed the first assessment and not satisfied the correlation criterion. If the correlation coefficient is greater than the threshold value, the segment is considered to have passed the first assessment and satisfied the correlation criterion.

Steps 908 and 910 are executed to provide the second assessment. At step 908, hours in the segment with loads greater than a low load threshold are counted. That is, the load on the HVAC equipment (e.g., the provided by the HVAC system $\dot{Q}_{HVAC}$) at each hour (or other sub-period) in the segment is determined and compared to a low load threshold. The low load threshold provides a value below which the load is considered to be too low to provide useful data for system identification. In some embodiments, the low load threshold is a predetermined value having units of load (e.g., kilowatts). In some embodiments, the low load threshold is determined as a percentage of a maximum equipment load, for example calculated as 10% of the maximum load during the segment (or during some other time period). At step 908, each hour with a load less than the low load threshold is counted, while hours with loads above the low load threshold are not counted. The number of hours in the segment with loads below the low load threshold (i.e., the count of low load hours) is thereby determined at step 908. Alternatively, the number of hours with loads above the low load threshold (i.e., a count of higher load hours) can be determined in a similar manner.

At step 910, the count (total number) of hours in the segment with loads below the low load thresholds is compared to a threshold number. If the count of low load hours is less than the threshold number, the segment is considered to have sufficient HVAC operation to contain useful data for use in system identification. The segment then passes the second assessment and satisfies a low load criterion. If the count of low load hours is greater than the threshold number, the segment is considered to have insufficient HVAC operation to contain useful data for use in system identification and the segment fails the second assessment (i.e., does not satisfy the low load criterion). In equivalent embodiments, a threshold number can be compared to a count of higher load hours and the second assessment passed/satisfied when the count is greater than the threshold number. In various embodiments, the threshold number can be any number between one and a maximum number corresponding to the entirety of the segment. For example, the threshold number may be selected to correspond to half of the duration of the segment.

Steps 912 and 914 are executed to perform a third assessment. At step 912, intervals between setpoint changes with durations between a minimum duration and a maximum duration are identified. For example, a time stamp for each setpoint change can be determined, and then an amount of time between consecutive setpoint changes can be calculated based on the time stamps (e.g., by subtracting the time stamp of a given setpoint change from the time stamp of the next setpoint change). This amount of time is referred to herein as a duration that a setpoint persists, a duration of an interval between setpoint changes (i.e., a duration spent at a constant setpoint following a change), a duration of a setpoint, a duration corresponding to a setpoint change, etc. In some embodiments, setpoint changes within a preset tolerance are ignored, for example setpoint changes within ±0.5 degrees, for the sake of determining whether a setpoint change has occurred. That is, changes within this resolution will not be considered as setpoint changes for the sake of performing the third assessment.

Each identified duration is then compared to an acceptable range defined by a minimum duration and a maximum duration (i.e., end points of a range). The minimum duration and the maximum duration may be defined to capture both fast-moving building thermal dynamics (e.g., changes in air temperature) and slow-moving building thermal dynamics (e.g., storage of energy in building mass) while excluding high frequency excitations that can be hard to distinguish from noise and very low frequency excitations that do not provide valuable information for system identification. For example, the minimum duration may have a preset value in a range between about one hour and about two hours in various embodiments, for example one hour. As another example, the maximum duration may have a preset value in a range between about eight hours and about twelve hours in various embodiments, for example eight hours. Setpoints that persist for durations in the range are considered to capture excitation frequencies which are useful for system model identification. Accordingly, at step 912, setpoints that persist for durations in the defined range are identified as valid setpoint changes.

At step 914, the durations associated with the valid setpoint changes are summed to get a total duration of valid setpoint changes for the segment, and the sum is compared to a threshold total duration. The threshold total duration may be defined as a smallest qualifying percentage of the duration of the segment, for example about 25% of the length of the segment. If the sum of durations of valid setpoint changes for the segment exceeds this threshold total duration, the third assessment is passed and the segment is considered as satisfying an excitation criterion. If the sum of the durations of the valid setpoint changes is less than the threshold total duration, the third assessment is failed and the segments is considered as not satisfying the excitation criterion.

In other embodiments, the amount of valid setpoint changes can be assessed using other rules as an alternative or additional test (e.g., fourth test). For example, the number of valid setpoint changes in a segment may be counted and compared to a threshold number (e.g., 4, 5, 6, etc.), such that the segment satisifies the excitation criterion if the number of valid setpoint changes is greater than the threshold number. In some embodiments, that threshold number is defined based on a count of a total number of setpoint changes for the segment (e.g., 25% of the total number, 50% of the total number, 75% of the total number). In some such embodiments, the count of valid setpoint changes compared to a threshold number is included as a fourth assessment in addition to or alternative to one or more of the other assessments of process 900.

The assessments can be repeated for multiple segments of a training period (i.e., a period in which training data is collected) to determine, for each segment, whether that segment passes the multiple assessments, e.g., satisfies the three (or four, etc.) criteria relating to multiple characteristics of the data for those segments. Accordingly, as shown in FIG. 9 according to some embodiments, the data selection approach includes conducting three (or two, or four, etc.) assessments of each segment, where each assessment involves a different characteristic (e.g., control correlation, load level, and setpoint timing) of the system behavior represented in the training data. Each segment is considered to have passed or failed each of the assessments (e.g., multiple results for each segment in the example shown). Because the assessments relate to different characteristics, the assessments work together to determine an overall quality of the training data for each segment beyond a determination that could be made with any one assessment. The combination of multiple assessments thus provides a synergy that ensures high quality training data that will result in highly accurate system identification, for example data representing periods in which the building equipment is successfully causing a measured condition to track a setpoint in situations that create rich system dynamics.

At step 916, segments which satisfy all criteria (e.g., pass all three assessments) are identified. For example, results of the assessments may be stored in a table, and then the table can be processed to determine which segments have a true, pass, etc. entry for all assessments. The segments identified as passing as all criteria are considered as corresponding to training data which is suitable for generation of an accurate predictive model via system identification, for example the system identification process 700 of FIG. 7 described above. Other system identification process that can be performed using the automatically-selected data resulting from process 900 are disclosed in U.S. patent application Ser. No. 16/738,878, filed Jan. 9, 2020, and U.S. patent application Ser. No. 16/513,054, filed Jul. 16, 2019, the entire disclosures of which are incorporated by reference herein.

Accordingly, at step 916, training data for the identified segments which pass all assessments are provided and used for system identification. In the example of FIG. 4, the training data for the identified segments is separated from the training data for the non-identified (assessment-failing) segments and provided to the model identifier 412. The training data for segments which fail one or more of the assessments (i.e., do not satisfy one or more criteria) can be discarded, ignored, deleted, etc. in various embodiments such that system identification is performed without using training data corresponding to those segments.

In some embodiments, step 916 includes determining whether a total duration of the identified segments (i.e., the segments that pass the assessments) meets a threshold duration corresponding to a sufficient amount of data for a system identification process. That is, step 916 can include a check to determine whether a sufficient amount of quality data is available in the training data received by process 900, or whether additional data needs to be obtained before system identification can proceed. In some examples, two weeks of training data is obtained and passed into step 902 and step 916 includes checking whether at least two days worth of training data (when aggregated from discontinuous segments) satisfies the assessments of steps 904-914. If sufficient quality data is available, step 916 passes the aggregated quality data onto step 918. If sufficient quality data is not available (i.e., less than a threshold amount of data passed the assessments), then step 916 can include restarting process 900 for a different or larger set of training data (e.g., data from a different two-week period) or initiating another process for supplying quality training data (e.g., generating simulated training data).

Process 900 thereby provides for automated data selection for online system identification to select data that will result in improved system models relative to training without the automated data selection process, while also substantially reducing the computing time required to perform system identification. For example, experimental results using real building data have shown that applying process 900 can improve the multistep prediction quality from 19.56% to 53.65% while also reducing the system identification algorithm running time from 32 minutes to 15 minutes. Improvements to the resulting models results in better control that more accurately tracks occupant preferences, improves comfort, reduces utility costs, and reduces energy resource consumption (e.g., reduces fossil fuel consumption, reduces carbon emissions) and improves the computing efficiency of performing system identification.

Configuration of Exemplary Embodiments

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A method comprising:
    operating equipment in accordance with a setpoint to affect a measurement for a space during a training period;
    performing a plurality of assessments of different characteristics of data for a segment of the training period;
    repeating the plurality of assessments for a plurality of additional segments of the training period;
    training a system model using a set of training data, wherein the data for the segment is included in the set of training data in response to passing the plurality of assessments or excluded from the set of training data in response to failing one or more of the plurality of assessments, and wherein data corresponding to the plurality of additional segments is included in the set of training data or excluded from the set of training data based on results of the plurality of assessments for the plurality of additional segments; and
    controlling the equipment using the system model.

2. The method of claim 1, wherein performing the plurality of assessments comprises:
    performing a first assessment of a correlation between the setpoint and the measurement during the segment;
    performing a second assessment of a load on the equipment during the segment relative to a threshold load; and
    performing a third assessment of durations between setpoint changes during the segment.

3. The method of claim 1, wherein performing the plurality of assessments comprises performing a first assessment, the first assessment comprising calculating a correlation coefficient based on values of the setpoint and the measured value for the segment and comparing the correlation coefficient to a threshold value.

4. The method of claim 1, wherein performing the plurality of assessments comprises performing a second assessment of a load on the equipment during the segment relative to a threshold load, the second assessment comprising determining the threshold load as a percentage of a maximum load during the segment.

5. The method of claim 1, wherein performing the plurality of assessments comprises performing a second assessment of a load on the equipment during the segment relative to a threshold load, the second assessment comprising determining whether the load on the equipment exceeds the threshold load for at least a threshold amount of the segment.

6. The method of claim 1, wherein performing the plurality of assessments comprises performing an assessment comprising determining the durations between setpoint changes to during the segment;
    labeling setpoint changes corresponding to durations within a predefined range as valid setpoint changes;
    calculating a sum of the durations for the valid setpoint changes; and
    comparing the sum to a threshold value.

7. The method of claim 1, further comprising determining whether a total duration of the segment and the additional segments included in the set of training data exceeds a threshold duration.

8. A system comprising:
    building equipment configured to operate in accordance with a setpoint for a variable state or condition of a space;
    a sensor configured to obtain a measured value for the variable state or condition of the space;
    a controller configured to:
        perform, for a segment of a training period, a test comprising at least one of:
            a first assessment of a correlation between the setpoint and the measured value during the segment;
            a second assessment of a load on the building equipment during the segment relative to a threshold load;
            a third assessment of durations between setpoint changes during the segment; or
            a fourth assessment of a count of the setpoint changes during the segment that satisfy a criterion;
        train a system model using a set of training data, wherein data corresponding to the segment is included or excluded from the set of training data based on the test; and
        control the building equipment using the system model.

9. The system of claim 8, wherein the test comprises the first assessment and the controller is configured to perform the first assessment by calculating a correlation coefficient based on values of the setpoint and the measured value for the segment and comparing the correlation coefficient to a threshold value.

10. The system of claim 8, wherein the test comprises the second assessment, wherein the controller is configured to perform the second assessment by determining the threshold load as a percentage of a maximum load during the segment.

11. The system of claim 8, wherein the test comprises the second assessment, wherein the controller is configured to perform the second assessment by determining whether the load on the equipment exceeds the threshold load for at least a threshold fraction of the segment.

12. The system of claim 8, wherein the test comprises the third assessment, wherein the controller is configured to perform the third assessment by:
    determining the durations between the setpoint changes during the segment;
    labeling the setpoint changes corresponding to durations within a predefined range as valid setpoint changes;
    calculating a sum of the durations for the valid setpoint changes; and
    comparing the sum to a threshold value.

13. The system of claim 8, wherein the test comprises the fourth assessment, wherein the controller is configured to perform the fourth assessment by:
    determining the durations between the setpoint changes during the segment;
    labeling the setpoint changes corresponding to durations within a predefined range as valid setpoint changes;
    comparing a count the valid setpoint changes to a threshold value.

14. The system of claim 8, wherein the controller is configured to repeat the test for a plurality of additional segments of the training period and include or exclude, from the set of training data, data corresponding to the plurality of additional segments based on results of the tests for the plurality of additional segments;

wherein the controller is further configured to determine whether a total duration of the segment and additional segments included in the set of training data exceeds a threshold duration.

15. The system of claim 8, wherein the test comprises the first assessment, the third assessment, and the fourth assessment.

16. Non-transitory computer-readable media storing program instructions that, when executed by a processor, cause the processor to perform operations comprising:

performing, for a segment of a training period, a test comprising at least one of:
- a first assessment of whether a correlation between a setpoint and a measurement during the segment satisfies a threshold correlation;
- a second assessment of whether a load on equipment exceeds a threshold load for at least an amount of the segment; or
- a third assessment of durations between setpoint changes during the segment relative to a minimum threshold duration and a maximum threshold duration;

including or excluding data for the segment from a set of training data for the training period based on the test; and controlling the equipment using a model trained based on the set of training data.

17. The non-transitory computer-readable media of claim 16, wherein performing the test comprises performing the first assessment, and wherein performing the first assessment comprises calculating a correlation coefficient based on values of the setpoint and the measurement for the segment and comparing the correlation coefficient to a threshold value.

18. The non-transitory computer-readable media of claim 16, wherein performing the test comprises performing the second assessment, and wherein performing the second assessment comprises determining the threshold load as a percentage of a maximum load during the segment.

19. The non-transitory computer-readable media of claim 16, wherein performing the test comprises performing the second assessment, and wherein performing the second assessment comprises determining whether the load on the equipment exceeds the threshold load for at least a threshold amount of the segment.

20. The non-transitory computer-readable media of claim 16, wherein performing the test comprises performing the third assessment, and wherein performing the third assessment comprises determining the durations between the setpoint changes during the segment;

labeling the setpoint changes corresponding to durations within a predefined range as valid setpoint changes;

calculating a sum of the durations for the valid setpoint changes; and comparing the sum to threshold value.

21. The non-transitory computer-readable media of claim 16, wherein performing the test comprises performing the third assessment, and wherein performing the third assessment comprises:

determining the durations between the setpoint changes during the segment;

labeling the setpoint changes corresponding to durations within a predefined range as valid setpoint changes; and comparing a count of the valid setpoint changes to a threshold number.

22. The non-transitory computer-readable media of claim 16, wherein the operations further comprise repeating the test for a plurality of additional segments of a training period and including or excluding, from the set of training data, data corresponding to for the plurality of additional segments based on results of the tests.

23. The non-transitory computer-readable media of claim 16, wherein the operations further comprise:

generating a set of control signals for the equipment that are predicted to cause the segment to pass the test when the control signals are applied to the equipment during the segment; and executing a system identification experiment by applying the control signals to the equipment.

\* \* \* \* \*